(12) United States Patent
Li et al.

(10) Patent No.: US 9,380,305 B2
(45) Date of Patent: Jun. 28, 2016

(54) GENERALIZED RESIDUAL PREDICTION IN HIGH-LEVEL SYNTAX ONLY SHVC AND SIGNALING AND MANAGEMENT THEREOF

(71) Applicant: QUALCOMM Incorporated, San Diego, CA (US)

(72) Inventors: Xiang Li, San Diego, CA (US); Ye-Kui Wang, San Diego, CA (US); Ying Chen, San Diego, CA (US); Jianle Chen, San Diego, CA (US); Adarsh Krishnan Ramasubramonian, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 333 days.

(21) Appl. No.: 14/242,679

(22) Filed: Apr. 1, 2014

(65) Prior Publication Data

US 2014/0301466 A1 Oct. 9, 2014

Related U.S. Application Data

(60) Provisional application No. 61/809,216, filed on Apr. 5, 2013, provisional application No. 61/811,070, filed on Apr. 11, 2013, provisional application No. 61/845,037, filed on Jul. 11, 2013.

(51) Int. Cl.
*H04N 11/02* (2006.01)
*H04N 19/105* (2014.01)
(Continued)

(52) U.S. Cl.
CPC ........... *H04N 19/105* (2014.11); *H04N 19/136* (2014.11); *H04N 19/187* (2014.11); *H04N 19/30* (2014.11); *H04N 19/597* (2014.11)

(58) Field of Classification Search
USPC ........................................ 375/240.01–240.29
See application file for complete search history.

(56) References Cited

U.S. PATENT DOCUMENTS

| 8,477,853 B2 * | 7/2013 | Wu ........................ H04N 19/30 375/240.25 |
| 2006/0083309 A1 * | 4/2006 | Schwarz ............ H04N 19/0003 375/240.16 |

(Continued)

OTHER PUBLICATIONS

Aminlou A., et al., "Non-CE3: Enhanced inter layer reference picture for Refldx based scalability," JCTVC-M0155, Apr. 2013, pp. 1-6.

(Continued)

*Primary Examiner* — Leron Beck
(74) *Attorney, Agent, or Firm* — Knobbe, Martens, Olson & Bear, LLP

(57) ABSTRACT

An apparatus for decoding video information according to certain aspects includes a memory unit and a processor operationally coupled to the memory unit. The memory unit is configured to store at least one reference picture list of an enhancement layer, the at least one reference picture list comprising residual prediction reference picture information. The processor is configured to: decode signaled information about residual prediction reference picture generation; generate a residual prediction reference picture based on an enhancement layer reference picture and the decoded signaled information such that the generated residual prediction reference picture has the same motion field and the same picture order count (POC) as the enhancement layer reference picture from which it is generated; and store the generated residual prediction reference picture in the at least one reference picture list of the enhancement layer.

30 Claims, 11 Drawing Sheets

(51) Int. Cl.
*H04N 19/597* (2014.01)
*H04N 19/30* (2014.01)
*H04N 19/136* (2014.01)
*H04N 19/187* (2014.01)

(56) References Cited

U.S. PATENT DOCUMENTS

| | | | | |
|---|---|---|---|---|
| 2006/0133485 A1* | 6/2006 | Park | H04N 19/105 | 375/240.08 |
| 2006/0233254 A1* | 10/2006 | Lee | H04N 19/70 | 375/240.16 |
| 2007/0014349 A1* | 1/2007 | Bao | H04N 19/139 | 375/240.1 |
| 2007/0019730 A1* | 1/2007 | Lee | H04N 19/52 | 375/240.15 |
| 2007/0286283 A1* | 12/2007 | Yin | H04N 19/70 | 375/240.16 |
| 2008/0002767 A1* | 1/2008 | Schwarz | H04N 19/147 | 375/240.12 |
| 2009/0003445 A1* | 1/2009 | Ying | H04N 19/105 | 375/240.15 |
| 2009/0034618 A1* | 2/2009 | Fu | H04N 19/46 | 375/240.16 |
| 2010/0091845 A1* | 4/2010 | Jeon | H04N 19/597 | 375/240.12 |
| 2012/0207219 A1* | 8/2012 | Someya | H04N 19/597 | 375/240.16 |
| 2013/0003851 A1* | 1/2013 | Yu | H04N 19/105 | 375/240.16 |
| 2013/0129240 A1* | 5/2013 | Shima | G06T 9/004 | 382/233 |
| 2013/0194505 A1* | 8/2013 | Pahalawatta | H04N 5/21 | 348/607 |
| 2013/0208792 A1* | 8/2013 | He | H04N 19/00569 | 375/240.12 |
| 2014/0064364 A1* | 3/2014 | Wang | H04N 19/33 | 375/240.12 |
| 2014/0086327 A1* | 3/2014 | Ugur | H04N 19/52 | 375/240.16 |

OTHER PUBLICATIONS

Bross B., et al., "High Efficiency Video Coding (HEVC) text specification draft 10 (for FDIS & Consent)," JCTVC-L1003-v20, Joint Collaborative Team on Video Coding (JCT-VC) of ITU-T SG 16 WP 3 and ISO/IEC JTC 1/SC 29/WG 11, 12th Meeting: Geneva, CH, Jan. 14-23, 2013, 329 Pages.

Chen J., et al., "SHVC Draft Text 1", Joint Collaborative Team on Video Coding (JCT-VC) of ITU-T SG16 WP3 and ISO/IEC JTC1/SC29/WG11 12th Meeting: Geneva, CH, JCTVC-L1008, Jan. 14-23, 2013; pp. 1-33.

Chen J., et al., "SHVC Test Model 1 (SHM1)," JCTVC-L1007, Feb. 2013, pp. 1-42.

Francois, E., et al., "Non-TE3: Simplification of Generalized Residual Inter-Layer Prediction (GRILP) in SHVC," Joint Collaborative Team on Video Coding (JCT-VC) of ITU-T SG 16 WP 3 and ISO/IEC JTC 1/SC 29/WG 11, 12th Meeting: Geneva, CH, Jan. 14-23, 2013, Document: JCTVC-L0104, pp. 1-5.

Han W.J., et al., "Improved Video Compression Efficiency Through Flexible Unit Representation and Corresponding Extension of Coding Tools," IEEE Transactions on Circuits and Systems for Video Technology, vol. 20, No. 12, Dec. 2010, pp. 1709-1720.

He Y., et al., "Non-SCE3: ILR enhancement with differential coding and Refldx framework," JCTVC-M0189, Apr. 2013, pp. 1-5.

Sjöberg R., et al., "Overview of HEVC High-Level Syntax and Reference Picture Management," IEEE Transactions on Circuits and Systems for Video Technology, vol. 22 (12), Dec. 2012, pp. 1858-1870.

International Search Report and Written Opinion—PCT/US2014/032707—ISA/EPO—Jul. 31, 2014.

Chen J., et al., "Description of scalable video coding technology proposal by Qualcomm (configuration 1)", 11. JCT-VC Meeting; 102. MPEG Meeting; Oct. 10-Oct. 19, 2012; Shanghai; (Joint Collaborative Team on Video Coding of ISO/IEC JTC1/SC29/WG11 and ITU-T SG.16); URL:http://wftp3.itu.int/av-arch/jctvc-site/, No. JCTVC-K0035, Oct. 2, 2012, XP030112967, pp. 1-19.

Lasserre S., et al., "Description of the scalable video coding technology proposal by Canon Research Centre France," 102. MPEG Meeting; Oct. 15-Oct. 19, 2012; Shanghai; (Motion Picture Expert Group or ISO/IEC JTC1/SC29/WG11), No. m26540, Oct. 10, 2012, XP030054873; pp. 1-78.

Li X. et al., "Non-TE3: Extension of Test 4.6.2.1 on Generalized Residual Prediction", 12. JCT-VC Meeting; 103. MPEG Meeting; Jan. 14-Jan. 23, 2013; Geneva; (Joint Collaborative Team on Video Coding of ISO/IEC JTC1/SC29/WG11 and ITU-T SG.16); URL: http://wftp3.itu.int/av-arch/jctvc-site/,,No. JCTVC-L0190, Jan. 8, 2013, XP030113678; 3 Pages.

Li X. et al., "TE3: Results of Test 4.6.2.1 on Generalized Residual Prediction", 12. JCT-VC Meeting; 103. MPEG Meeting; Jan. 14-Jan. 23, 2013; Geneva; (Joint Collaborative Team on Video Coding of ISO/IEC JTC1/SC29/WG11 and ITU-T SG.16); URL: http://wftp3.itu.int/av-arch/jctvc-site/,, No. JCTVC-L0078, Jan. 8, 2013, XP030113566; 8 Pages.

* cited by examiner

GENERALIZED RESIDUAL PREDICTION IN HIGH-LEVEL SYNTAX ONLY SHVC AND SIGNALING AND MANAGEMENT THEREOF

RELATED APPLICATIONS

This application claims the benefit of U.S. Provisional Application No. 61/809,216, filed on Apr. 5, 2013, entitled "SIGNALING AND MANAGEMENT OF GENERALIZED RESIDUAL PREDICTION IN HIGH-LEVEL SYNTAX ONLY SHVC," U.S. Provisional Application No. 61/811, 070, filed on Apr. 11, 2013, entitled "GENERALIZED RESIDUAL PREDICTION IN HIGH-LEVEL SYNTAX ONLY SHVC," and U.S. Provisional Application No. 61/845, 037, filed on Jul. 11, 2013, entitled "GENERALIZED RESIDUAL PREDICTION IN HIGH-LEVEL SYNTAX ONLY SHVC," which are incorporated herein by reference in their entireties.

TECHNICAL FIELD

This disclosure is related to the signaling and management of generalized residual prediction (GRP) reference pictures in high-level syntax only scalable video coding and 3D video coding in the context of advanced video codecs, such as HEVC (High Efficiency Video Coding).

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

The systems, methods and devices of this disclosure each have several innovative aspects, no single one of which is solely responsible for the desirable attributes disclosed herein.

In general, in some aspects, this disclosure describes techniques that generate one or more residual prediction reference pictures based on enhancement layer reference pictures. According to certain aspects, the generated residual prediction reference pictures can provide the effect of applying weighted generalized residual prediction at a block level. The generated residual prediction reference pictures can share the same motion field as the reference pictures from the enhancement layer on which they are based. The generated residual prediction reference pictures can also have the same picture order count (POC) number as the enhancement layer reference pictures on which they are based. The residual prediction reference pictures may be generated based on signaled information received in a bitstream, rather than being decoded. The techniques may signal information relating to how to generate the residual prediction reference pictures.

An apparatus for decoding video information according to certain aspects includes a memory unit and a processor operationally coupled to the memory unit. The memory unit is configured to store at least one reference picture list of an enhancement layer, the at least one reference picture list comprising residual prediction reference picture information. The processor is configured to: decode signaled information about residual prediction reference picture generation; generate a residual prediction reference picture based on an enhancement layer reference picture and the decoded signaled information such that the generated residual prediction reference picture has the same motion field and the same picture order count (POC) as the enhancement layer reference picture from which it is generated; and store the generated residual prediction reference picture in the at least one reference picture list of the enhancement layer.

An apparatus for encoding video information according to certain aspects includes a memory unit and a processor operationally coupled to the memory unit. The memory unit is configured to store at least one reference picture list associated with one or more layers of video information in scalable video coding. The processor is configured to: encode information about generating a residual prediction reference picture based at least in part on a corresponding enhancement layer reference picture associated with an enhancement layer, the residual prediction reference picture configured to have the same motion field and the same picture order count (POC) as the enhancement layer reference picture from which it is to be generated; and signal the encoded information in a bitstream.

The details of one or more examples are set forth in the accompanying drawings and the description below. Other features, objects, and advantages will be apparent from the description and drawings, and from the claims.

DETAILED DESCRIPTION

Figure 1:
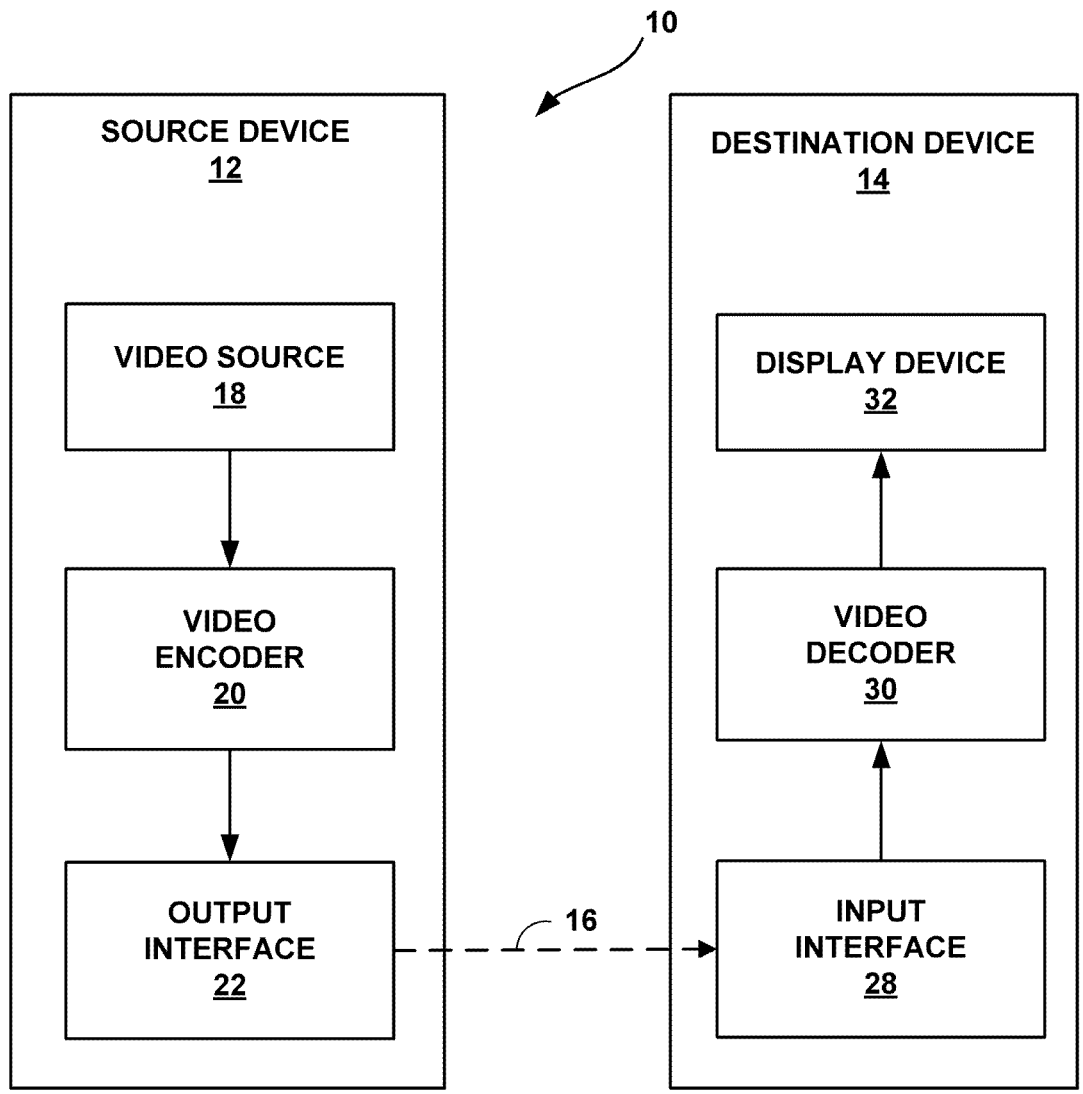
FIG. 1 is a block diagram illustrating an example video encoding and decoding system that may utilize techniques in accordance with aspects described in this disclosure.

The techniques described in this disclosure generally relate to scalable video coding (SVC) and 3D video coding. For example, the techniques may be related to, and used with or within, a High Efficiency Video Coding (HEVC) scalable video coding (SVC) extension. The HEVC SVC extension may also be referred to as Scalable HEVC (SHVC). In an SVC extension, there could be multiple layers of video information. The layer at the very bottom level may serve as a base layer (BL), and the layer at the very top may serve as an enhanced layer (EL). The "enhanced layer" is sometimes referred to as an "enhancement layer," and these terms may be used interchangeably. All layers in the middle may serve as either or both ELs or BLs. For example, a layer in the middle may be an EL for the layers below it, such as the base layer or any intervening enhancement layers, and at the same time serve as a BL for the enhancement layers above it.

For purposes of illustration only, the techniques described in the disclosure are described with examples including only two layers (e.g., lower level layer such as the base layer, and a higher level layer such as the enhanced layer). It should be understood that the examples described in this disclosure can be extended to examples with multiple base layers and enhancement layers as well.

Video coding standards include ITU-T H.261, ISO/IEC MPEG-1 Video, ITU-T H.262 or ISO/IEC MPEG-2 Video, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions. The latest joint draft of SVC and MVC is described in "Advanced Video Coding for Generic Audiovisual Services," ITU-T Recommendation H.264, March 2010.

In addition, a new video coding standard, namely High Efficiency Video Coding (HEVC), is being developed by the Joint Collaboration Team on Video Coding (JCT-VC) of ITU-T Video Coding Experts Group (VCEG) and ISO/IEC Motion Picture Experts Group (MPEG). Various working drafts of the HEVC specification have been made available, including versions 7 and 8. The approved HECV specification can be found at http://www.itu.int/rec/T-REC-H.265-201304-I. Each of these references is incorporated by reference in its entirety.

In addition, each of the following publications is incorporated herein in its entirety by reference. The following references may be referred to by the corresponding number preceding the reference in the disclosure in order to facilitate discussion.

[1] W. J. Han, J. Min, I. K. Kim, E. Alshina, A. Alshin, T. Lee; J. Chen; V. Seregin, S. Lee, Y. M Hong, M. S. Cheon, N. Shlyakhov, K. McCann, T. Davies, J. H. Park, "Improved Video Compression Efficiency Through Flexible Unit Representation and Corresponding Extension of Coding Tools", IEEE Transaction on Circuits and Systems for Video Technology, vol. 20, no. 12, pp. 1709-1720, December 2010.

[2] B. Bross, W.-J. Han, J.-R. Ohm, G. J. Sullivan, T. Wiegand, Y.-K. Wang, "High efficiency video coding (HEVC) text specification draft 10 (for FDIS & Consent)", Joint Collaborative Team on Video Coding (JCT-VC) of ITU-T SG16 WP3 and ISO/IEC JTC1/SC29/WG11, JCTVC-L1003, Geneva, Switzerland, January 2013.

[3] E. Francois, J. Taquet, C. Gisquet, G. Laroche, P. Onno, "Non-TE3: Simplification of Generalized Residual Inter-Layer Prediction (GRILP) in SHVC", doc. JCTVC-L0104, 12th Meeting of Joint Collaborative Team on Video Coding (JCT-VC) of ITU-T SG16 WP3 and ISO/IEC JTC1/SC29/WG11, Geneva, Switzerland, 14-23 Jan. 2013.

[4] R. Sjoeberg, Y. Chen, A. Fujibayashi, M. M. Hannuksela, J. Samuelsson, T. K. Tan, Y.-K. Wang, and S. Wenger, "Overview of HEVC High-Level Syntax and Reference Picture Management", IEEE Transaction on Circuits and Systems for Video Technology, vol. 22, no. 12, pp. 1858-1870, December 2012.

[5] J. Chen, J. Boyce, Y. Ye, M. M. Hannuksela, "SHVC Working Draft 1", JCTVC-L1008, March 2013.

[6] J. Chen, Y. Ye, J. Boyce, M. M. Hannuksela, "SHVC Test Model 1 (SHM1)", JCTVC-L1007, February 2013.

[7] A. Aminlou, J. Lainema, K. Ugur, M. Hannuksela, "Non-CE3: Enhanced inter layer reference picture for RefIdx based scalability", JCTVC-M0155, April 2013.

[8] Y. He, Y. Ye, "Non-SCE3: ILR enhancement with differential coding for RefIdx framework", JCTVC-M0189, April 2013.

Scalable video coding (SVC) may be used to provide quality (also referred to as signal-to-noise (SNR)) scalability, spatial scalability and/or temporal scalability. An enhanced layer may have different spatial resolution than base layer. For example, the spatial aspect ratio between EL and BL can be 1.0, 1.5, 2.0 or other different ratios. In other words, the spatial aspect of the EL may equal 1.0, 1.5, or 2.0 times the spatial aspect of the BL. In some examples, the scaling factor of the EL may be greater than the BL. For example, a size of pictures in the EL may be greater than a size of pictures in the BL. In this way, it may be possible, although not a limitation, that the spatial resolution of the EL is larger than the spatial resolution of the BL.

A generalized residual prediction (GRP) framework has been described in U.S. Provisional Application No. 61/670,075, filed Jul. 10, 2012, U.S. Provisional Application No. 61/706,692, filed Sep. 27, 2012, U.S. application Ser. No.

13/933,588, filed Jul. 2, 2013, U.S. Provisional Application No. 61/680,522, filed Aug. 7, 2012, and U.S. application Ser. No. 13/957,841, filed Aug. 2, 2013, the disclosures of which are incorporated herein in their entireties by reference. The GRP framework can apply a weighting factor to the residue of the reference layer. Inter-layer residual prediction uses the residue of the reference layer in predicting the current video unit, for example, a block or a frame. In generalized residual prediction, the inter-layer residual prediction of the current video unit may be based on the residue of the current layer, the temporal prediction or the spatial prediction of the current layer, and the residue of the reference layer. The residue of the reference layer may be adjusted by a weighting factor. Adjusting the weighting factor appropriately may lead to significant coding gains for residual prediction. The GRP can accommodate traditional residual prediction when the weighting factor is set to 1.

However, in high-level syntax only SHVC, there is no new block level coding tool when compared to HEVC single layer coding, and accordingly, GRP cannot be provided at the block level. Only slice and above level syntax changes and picture level operations, including picture filtering and/or up-sampling, are allowed in high-level syntax only SHVC.

The techniques described in this disclosure may address incorporating weighted generalized residual prediction in high-level syntax only SHVC. The techniques described in this disclosure can generate one or more residual prediction reference pictures based on enhancement layer reference pictures. The residual prediction reference pictures may also be referred to as "GRP reference pictures." According to certain aspects, the generated residual prediction reference pictures can provide the effect of applying weighted generalized residual prediction at a block level. For example, the residual prediction reference pictures can incorporate the weighting factor used in GRP. The generated residual prediction reference pictures can share the same motion field as the reference pictures from the enhancement layer on which they are based. The generated residual prediction reference pictures can also have the same picture order count (POC) number as the enhancement layer reference pictures on which they are based. The residual prediction reference pictures may be generated based on signaled information received in a bitstream, rather than being decoded. The techniques can signal how to generate the residual prediction reference pictures. Generally, SHVC provides only one reference picture for a POC number. Since multiple reference pictures can be provided for the same POC, the techniques can also provide various ways to signal which reference picture(s) should be used.

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

FIG. 1 is a block diagram illustrating an example video encoding and decoding system that may utilize techniques in accordance with aspects described in this disclosure. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (e.g., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 32. In accordance with this disclosure, video encoder 20 of source device 12 may be configured to apply the techniques for coding a bitstream including video data conforming to multiple standards or standard extensions. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for determining candidates for a candidate list for motion vector predictors for a current block may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission, direct wired communication, etc. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., GOPs. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 may operate according to a video coding standard, such as the High Efficiency Video Coding (HEVC) standard presently under development, and may conform to the HEVC Test Model (HM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard, including but not limited to any of the standards listed above. Other examples of video coding standards include MPEG-2 and ITU-T H.263. Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device. A device including video encoder 20 and/or video decoder 30 may comprise an integrated circuit, a microprocessor, and/or a wireless communication device, such as a cellular telephone.

The JCT-VC is working on development of the HEVC standard. The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three intra-prediction encoding modes.

In general, the working model of the HM describes that a video frame or picture may be divided into a sequence of treeblocks or largest coding units (LCU) that include both luma and chroma samples. Syntax data within a bitstream may define a size for the LCU, which is a largest coding unit in terms of the number of pixels. A slice includes a number of consecutive treeblocks in coding order. A video frame or picture may be partitioned into one or more slices. Each treeblock may be split into coding units (CUs) according to a quadtree. In general, a quadtree data structure includes one node per CU, with a root node corresponding to the treeblock. If a CU is split into four sub-CUs, the node corresponding to the CU includes four leaf nodes, each of which corresponds to one of the sub-CUs.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, four sub-CUs of a leaf-CU will also be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split.

A CU has a similar purpose as a macroblock of the H.264 standard, except that a CU does not have a size distinction. For example, a treeblock may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a treeblock may be split, referred to as a maximum CU depth, and may also define a minimum size of the coding nodes. Accordingly, a bitstream may also define a smallest coding unit (SCU). This disclosure uses the term "block" to refer to any of a CU, PU, or TU, in the context of HEVC, or similar data structures in the context of other standards (e.g., macroblocks and sub-blocks thereof in H.264/AVC).

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square (e.g., rectangular) in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

A leaf-CU may include one or more prediction units (PUs). In general, a PU represents a spatial area corresponding to all or a portion of the corresponding CU, and may include data for retrieving a reference sample for the PU. Moreover, a PU includes data related to prediction. For example, when the PU is intra-mode encoded, data for the PU may be included in a residual quadtree (RQT), which may include data describing an intra-prediction mode for a TU corresponding to the PU. As another example, when the PU is inter-mode encoded, the PU may include data defining one or more motion vectors for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

A leaf-CU having one or more PUs may also include one or more transform units (TUs). The transform units may be specified using an RQT (also referred to as a TU quadtree structure), as discussed above. For example, a split flag may indicate whether a leaf-CU is split into four transform units. Then, each transform unit may be split further into further sub-TUs. When a TU is not split further, it may be referred to as a leaf-TU. Generally, for intra coding, all the leaf-TUs belonging to a leaf-CU share the same intra prediction mode. That is, the same intra-prediction mode is generally applied to calculate predicted values for all TUs of a leaf-CU. For intra coding, a video encoder may calculate a residual value for each leaf-TU using the intra prediction mode, as a difference between the portion of the CU corresponding to the TU and the original block. A TU is not necessarily limited to the size of a PU. Thus, TUs may be larger or smaller than a PU. For intra coding, a PU may be collocated with a corresponding leaf-TU for the same CU. In some examples, the maximum size of a leaf-TU may correspond to the size of the corresponding leaf-CU.

Moreover, TUs of leaf-CUs may also be associated with respective quadtree data structures, referred to as residual quadtrees (RQTs). That is, a leaf-CU may include a quadtree indicating how the leaf-CU is partitioned into TUs. The root node of a TU quadtree generally corresponds to a leaf-CU, while the root node of a CU quadtree generally corresponds to a treeblock (or LCU). TUs of the RQT that are not split are referred to as leaf-TUs. In general, this disclosure uses the terms CU and TU to refer to leaf-CU and leaf-TU, respectively, unless noted otherwise.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up," "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a nonnegative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise syntax data describing a method or mode of generating predictive pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

Following quantization, the video encoder may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array. In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

Video encoder 20 may further send syntax data, such as block-based syntax data, frame-based syntax data, and GOP-based syntax data, to video decoder 30, e.g., in a frame header, a block header, a slice header, or a GOP header. The GOP syntax data may describe a number of frames in the respective GOP, and the frame syntax data may indicate an encoding/prediction mode used to encode the corresponding frame.

Figure 2:
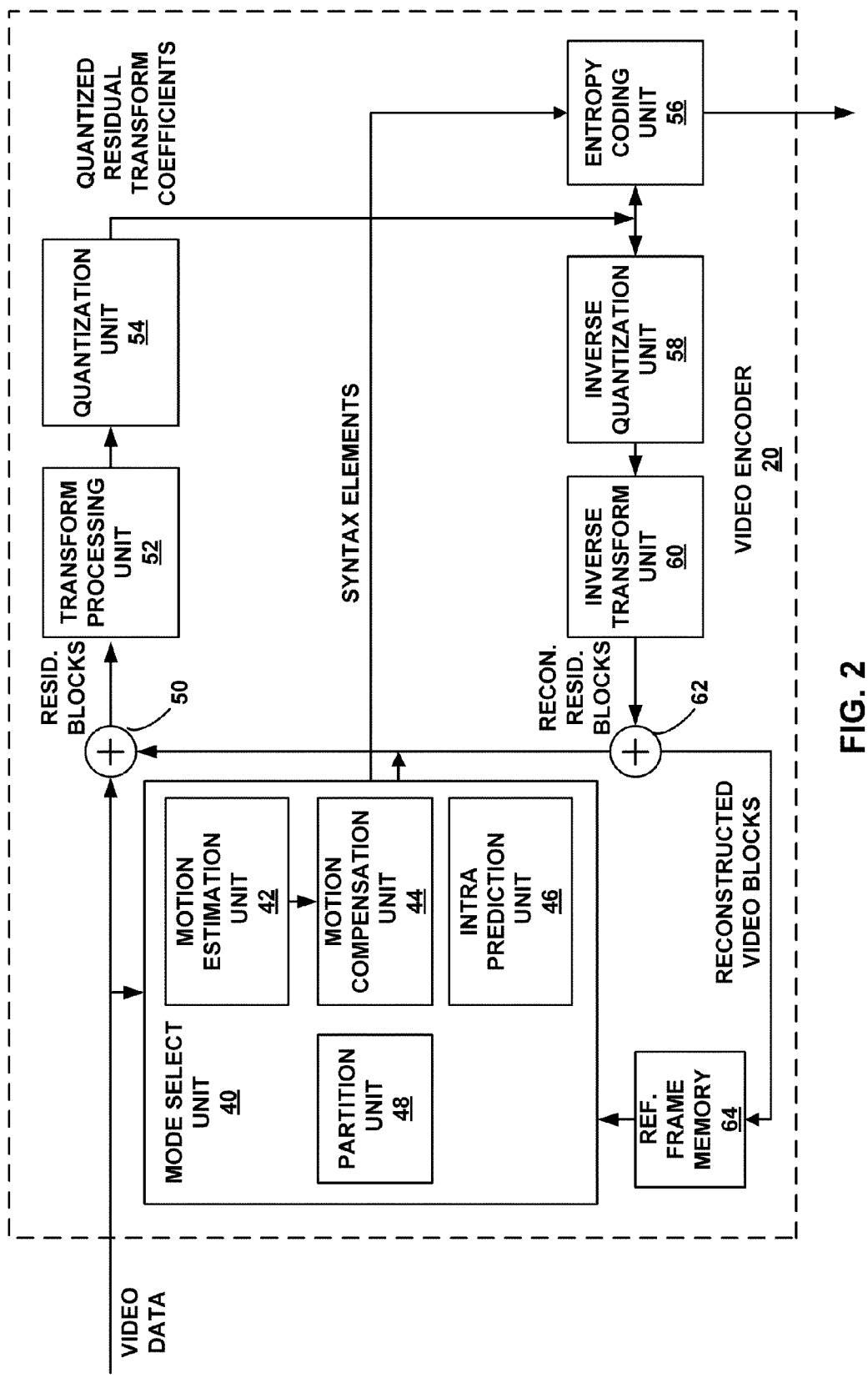
FIG. 2 is a block diagram illustrating an example of a video encoder that may implement techniques in accordance with aspects described in this disclosure.

FIG. 2 is a block diagram illustrating an example of a video encoder that may implement techniques in accordance with aspects described in this disclosure. Video encoder 20 may be configured to perform any or all of the techniques of this disclosure. As one example, mode select unit 40 may be configured to perform any or all of the techniques described in this disclosure. However, aspects of this disclosure are not so limited. In some examples, the techniques described in this disclosure may be shared among the various components of video encoder 20. In some examples, in addition to or instead of, a processor (not shown) may be configured to perform any or all of the techniques described in this disclosure.

In some embodiments, the mode select unit 40, the motion estimation unit 42, motion compensation unit 44 (or another component of the mode select unit 40, shown or not shown), or another component of the encoder 20 (shown or not shown) may perform the techniques of this disclosure. For example, the mode select unit 40 may generate one or more residual prediction reference pictures based on which motion estimation and motion compensation can be performed. The encoder 20 may encode information about generating a residual prediction reference picture based at least in part on a corresponding enhancement layer reference picture associated with an enhancement layer. The residual prediction reference picture to be generated can have the same motion field and the same picture order count (POC) as the enhancement layer reference picture from which it is to be generated. The encoder 20 can signal the encoded information in a bitstream.

Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes.

As shown in FIG. 2, video encoder 20 receives a current video block within a video frame to be encoded. In the example of FIG. 1, video encoder 20 includes mode select unit 40, reference frame memory 64, summer 50, transform processing unit 52, quantization unit 54, and entropy encoding unit 56. Mode select unit 40, in turn, includes motion compensation unit 44, motion estimation unit 42, intra-prediction unit 46, and partition unit 48. For video block reconstruction, video encoder 20 also includes inverse quantization unit 58, inverse transform unit 60, and summer 62. A deblocking filter (not shown in FIG. 2) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter).

During the encoding process, video encoder 20 receives a video frame or slice to be coded. The frame or slice may be divided into multiple video blocks. Motion estimation unit 42 and motion compensation unit 44 perform inter-predictive coding of the received video block relative to one or more blocks in one or more reference frames to provide temporal prediction. Intra-prediction unit 46 may alternatively perform intra-predictive coding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into LCUs, and partition each of the LCUs into sub-CUs based on rate-distortion analysis (e.g., rate-distortion optimization). Mode select unit 40 may further produce a quadtree data structure indicative of partitioning of an LCU into sub-CUs. Leaf-node CUs of the quadtree may include one or more PUs and one or more TUs.

Mode select unit 40 may select one of the coding modes, intra or inter, e.g., based on error results, and provides the resulting intra- or inter-coded block to summer 50 to generate residual block data and to summer 62 to reconstruct the encoded block for use as a reference frame. Mode select unit 40 also provides syntax elements, such as motion vectors, intra-mode indicators, partition information, and other such syntax information, to entropy encoding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference frame memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference frame memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

After selecting an intra-prediction mode for a block, intra-prediction unit 46 may provide information indicative of the selected intra-prediction mode for the block to entropy encoding unit 56. Entropy encoding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used. In any case, transform processing unit 52 applies the transform to the residual block, producing a block of residual transform coefficients. The transform may convert the residual information from a pixel value domain to a transform domain, such as a frequency domain. Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy codes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy encoding unit 56, the encoded bitstream may be transmitted to another device (e.g., video decoder 30) or archived for later transmission or retrieval.

Inverse quantization unit 58 and inverse transform unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of reference frame memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference frame memory 64. The reconstructed video block may be used by motion estimation unit 42 and motion compensation unit 44 as a reference block to inter-code a block in a subsequent video frame.

Figure 3:
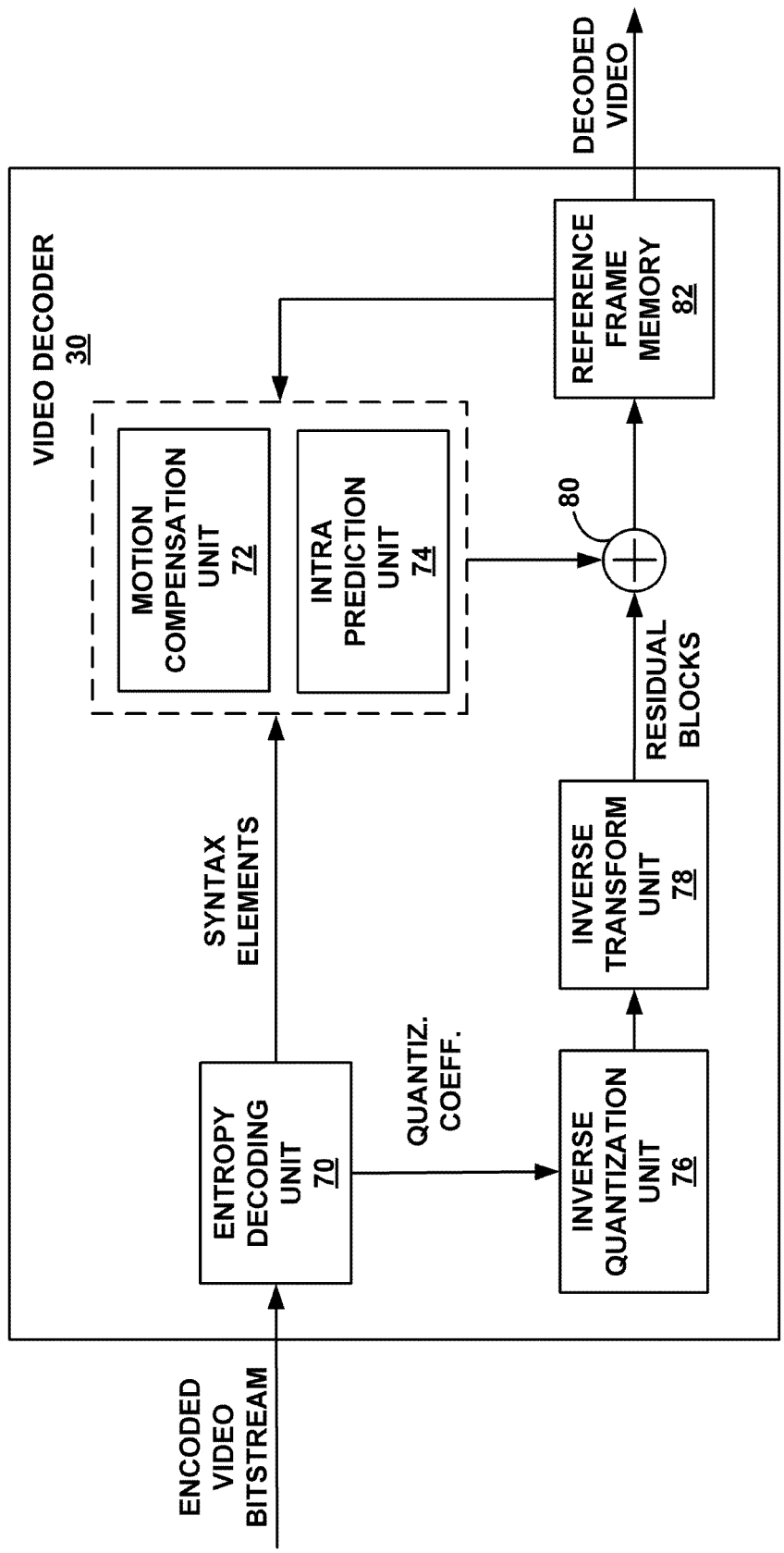
FIG. 3 is a block diagram illustrating an example of a video decoder that may implement techniques in accordance with aspects described in this disclosure.

FIG. 3 is a block diagram illustrating an example of a video decoder that may implement techniques in accordance with aspects described in this disclosure. Video decoder 30 may be configured to perform any or all of the techniques of this disclosure. As one example, motion compensation unit 72 and/or intra prediction unit 74 may be configured to perform any or all of the techniques described in this disclosure. However, aspects of this disclosure are not so limited. In some examples, the techniques described in this disclosure may be shared among the various components of video decoder 30. In some examples, in addition to or instead of, a processor (not shown) may be configured to perform any or all of the techniques described in this disclosure.

In some embodiments, the entropy decoding unit 70, the motion compensation unit 72, or another component of the decoder 30 (shown or not shown) may perform the techniques of this disclosure. The decoder 30 can decode signaled information about residual prediction reference picture generation. The motion compensation unit 72 can generate a residual prediction reference picture based on an enhancement layer reference picture and the decoded signaled information such that the generated residual prediction reference picture has the same motion field and the same picture order count (POC) as the enhancement layer reference picture from which it is generated. The motion compensation unit 72 can store the generated residual prediction reference picture in the at least one reference picture list (e.g., in the reference frame memory 82) of the enhancement layer.

In the example of FIG. 3, video decoder 30 includes an entropy decoding unit 70, motion compensation unit 72, intra prediction unit 74, inverse quantization unit 76, inverse transformation unit 78, reference frame memory 82 and summer 80. Video decoder 30 may, in some examples, perform a decoding pass generally reciprocal to the encoding pass described with respect to video encoder 20 (FIG. 2). Motion compensation unit 72 may generate prediction data based on motion vectors received from entropy decoding unit 70, while intra-prediction unit 74 may generate prediction data based on intra-prediction mode indicators received from entropy decoding unit 70.

During the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, motion vectors or intra-prediction mode indicators, and other syntax elements. Entropy decoding unit 70 forwards the motion vectors to and other syntax elements to motion compensation unit 72. Video decoder 30 may receive the syntax elements at the video slice level and/or the video block level.

When the video slice is coded as an intra-coded (I) slice, intra prediction unit 74 may generate prediction data for a video block of the current video slice based on a signaled intra prediction mode and data from previously decoded blocks of the current frame or picture. When the video frame is coded as an inter-coded (e.g., B, P or GPB) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference frame lists, List 0 and List 1, using default construction techniques based on reference pictures stored in reference frame memory 82. Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Inverse quantization unit 76 inverse quantizes, e.g., de-quantizes, the quantized transform coefficients provided in the bitstream and decoded by entropy decoding unit 70. The inverse quantization process may include use of a quantization parameter $QP_Y$ calculated by video decoder 30 for each video block in the video slice to determine a degree of quantization and, likewise, a degree of inverse quantization that should be applied.

Inverse transform unit 78 applies an inverse transform, e.g., an inverse DCT, an inverse integer transform, or a conceptually similar inverse transform process, to the transform coefficients in order to produce residual blocks in the pixel domain.

After motion compensation unit 72 generates the predictive block for the current video block based on the motion vectors and other syntax elements, video decoder 30 forms a decoded video block by summing the residual blocks from inverse transform unit 78 with the corresponding predictive blocks generated by motion compensation unit 72. Summer 80 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference frame memory 82, which stores reference pictures used for subsequent motion compensation. Reference frame memory 82 also stores decoded video for later presentation on a display device, such as display device 32 of FIG. 1.

Motion Compensation in HEVC

In general, HEVC follows the framework of previous video coding standards. The motion compensation loop of HEVC is kept the same as that in H.264/AVC, e.g., the reconstruction of the current frame $\hat{I}$ equals de-quantized coefficients r plus temporal prediction P:

$$\hat{I} = r + P, \quad (1)$$

where P indicates uni-directional prediction for P frames or bi-directional prediction for B frames.

The unit of motion compensation in HEVC is different from that in previous video coding standards. The concept of macroblock in previous video coding standards does not exist in HEVC. Macroblock is replaced by a highly flexible hierarchical structure based on generic quadtree scheme. Within this scheme, three types of blocks, e.g., Coding Unit (CU), Prediction Unit (PU), and Transform Unit (TU), are defined. CU is the basic unit of region splitting. CU is analogous to the concept of macroblock, but it does not restrict the maximum size and it allows recursive splitting into four equal size CUs to improve the content adaptivity. PU is the basic unit of inter/intra prediction and it may contain multiple arbitrary shape partitions in a single PU to effectively code irregular image patterns. TU is the basic unit of transform. It can be defined independently from the PU; however, its size is limited to the CU which the TU belongs to. This separation of the block structure into three different concepts allows each to be optimized according to its role, which results in the improved coding efficiency.

Reference Management in HEVC

In HEVC, previously decoded pictures are managed in a decoded picture buffer (DPB) for reference under the concept of reference parameter set (RPS). Pictures in the DPB can be marked as "used for short-term reference," "used for long term reference" or "unused for reference." Once a picture has been marked as "unused for reference," it can no longer be used for prediction, and when it is no longer needed for output it can be removed from the DPB. The RPS concept for reference picture management is fundamentally different from the reference picture management of previous video coding standards. Instead of signaling relative changes to the DPB, the status of the DPB is signaled in every slice. A goal in the HEVC development for reference picture management was to have a basic level of error robustness in all standard conforming bitstreams and decoders.

Signaling of RPSs

Each slice header in HEVC must include parameters for signaling of the RPS for the picture containing the slices. The only exception is that no RPS is signaled for Instantaneous Decoder Refresh (IDR) slices. Instead, the RPS is inferred to be empty. For I slices that do not belong to an IDR picture, an RPS may be provided, even if they belong to an I picture since there may be pictures following the I picture in decoding order which use inter prediction from pictures that preceded the I picture in decoding order. The number of pictures in an RPS should not exceed the DPB size limit as specified by the sps_max_decpic_buffering syntax element in the sequence parameter set (SPS).

Each picture is associated with a picture order count (POC) value that represents the output order. The slice headers contain a fixed-length codeword, pic_order_cnt_lsb, representing the least significant bits of the full POC value, also known as the POC LSB. The length of the codeword is signaled in the SPS and can be between 4 and 16 bits. The RPS concept uses POC to identify reference pictures. Besides its own POC value, each slice header directly contains or inherits from the SPS a coded representation of the POC values of each picture in the RPS.

The RPS for each picture consists of five different lists of reference pictures, also referred to as the five RPS subsets:

RefPicSetStCurrBefore comprises all short-term reference pictures that are prior to the current picture in both decoding order and output order, and that may be used in inter prediction of the current picture.

RefPicSetStCurrAfter comprises all short-term reference pictures that are prior to the current picture in decoding order, that succeed the current picture in output order, and that may be used in inter prediction of the current picture.

RefPicSetStFoll comprises all short-term reference pictures that may be used in inter prediction of one or more of the pictures following the current picture in decoding order, and that are not used in inter prediction of the current picture.

RefPicSetLtCurr comprises all long-term reference pictures that may be used in inter prediction of the current picture.

RefPicSetLtFoll comprises all long-term reference pictures that may be used in inter prediction of one or more of the pictures following the current picture in decoding order, and that are not used in inter prediction of the current picture.

The RPS is signaled using up to three loops iterating over different types of reference pictures; short-term reference pictures with lower POC value than the current picture, short term reference pictures with higher POC value than the current picture and long-term reference pictures. In addition, a flag (used_by_curr_pic_X_flag) is sent for each reference picture indicating whether the reference picture is used for reference by the current picture (included in one of the lists RefPicSetStCurrBefore, RefPicSetStCurrAfter, or RefPicSetLtCurr) or not (included in one of the lists RefPicSetStFoll or RefPicSetLtFoll).

Picture Marking

Before picture decoding, there will typically be a number of pictures present in the DPB. Some of them may be available for prediction and thus marked as "used for reference." Others may be unavailable for prediction but waiting for output, thus marked as "unused for reference." When the slice header has been parsed, a picture marking process is carried out before the slice data is decoded. Pictures that are present in the DPB and marked as "used for reference" but are not included in the RPS are marked "unused for reference." Pictures that are not present in the DPB but are included in the reference picture set are ignored if the used_by_curr_pic_X_flag is equal to zero. However, if the used_by_curr_pic_X_flag instead is equal to one, this reference picture was intended to be used for prediction in the current picture but is missing. Then, an unintentional picture loss is inferred and the decoder should take appropriate actions. After decoding the current picture, it is marked "used for short-term reference."

Short-Term Reference Picture Set Syntax

An example of syntax for short-term reference picture set is provided below.

| short_term_ref_pic_set( stRpsIdx ) { | Descriptor |
|---|---|
| if( stRpsIdx != 0 ) | |
|   inter_ref_pic_set_prediction_flag | u(1) |
| if( inter_ref_pic_set_prediction_flag ) { | |
|   if( stRpsIdx = = num_short_term_ref_pic_sets ) | |
|     delta_idx_minus1 | ue(v) |
|   delta_rps_sign | u(1) |
|   abs_delta_rps_minus1 | ue(v) |
|   for( j = 0; j <= NumDeltaPocs[ RefRpsIdx ]; j++ ) { | |
|     used_by_curr_pic_flag[ j ] | u(1) |
|     if( !used_by_curr_pic_flag[ j ] ) | |
|       use_delta_flag[ j ] | u(1) |
|   } | |
| } else { | |
|   num_negative_pics | ue(v) |
|   num_positive_pics | ue(v) |
|   for( i = 0; i < num_negative_pics; i++ ) { | |
|     delta_poc_s0_minus1[ i ] | ue(v) |
|     used_by_curr_pic_s0_flag[ i ] | u(1) |
|   } | |
|   for( i = 0; i < num_positive_pics; i++ ) { | |
|     delta_poc_s1_minus1[ i ] | ue(v) |
|     used_by_curr_pic_s1_flag[ i ] | u(1) |
|   } | |
| } | |
| } | |

Reference List Initialization

Reference picture list initialization creates two default lists, List0 and List1 (if the slice is a B slice) based on three RPS subsets: RefPicSetStCurrBefore, RefPicSetStCurrAfter, and RefPicSetLtCurr. Short-term pictures with earlier output order are firstly inserted into the List 0 in ascending order of POC distance to the current picture, then short-term pictures with later output order are inserted into the List 0 in ascending order of POC distance to the current picture, and finally the long-term pictures are inserted at the end. Similarly, short-term pictures with later output order are firstly inserted into the List 1 in ascending order of POC distance to the current picture, then short-term pictures with earlier output order are inserted into the List 1 in ascending order of POC distance to the current picture, and finally the long-term pictures are inserted at the end. In terms of RPS, for List 0, the entries in RefPicSetStCurrBefore are inserted in the initial list, followed by the entries in RefPicSetStCurrAfter. Afterward, the entries in RefPicSetLtCurr, if available, are appended. In HEVC, the above process is repeated (reference pictures that have already been added to the reference picture list are added again) when the number of entries in a list is smaller than the target number of active reference pictures (signaled in the picture parameter set or slice header). When the number of entries is larger than the target number the list is truncated.

Scalable Extension of H.264/AVC

A brief introduction of the Scalable Video Coding, the scalable extension of H.264/AVC, is provided below.

Structures of SVC

Figure 4:
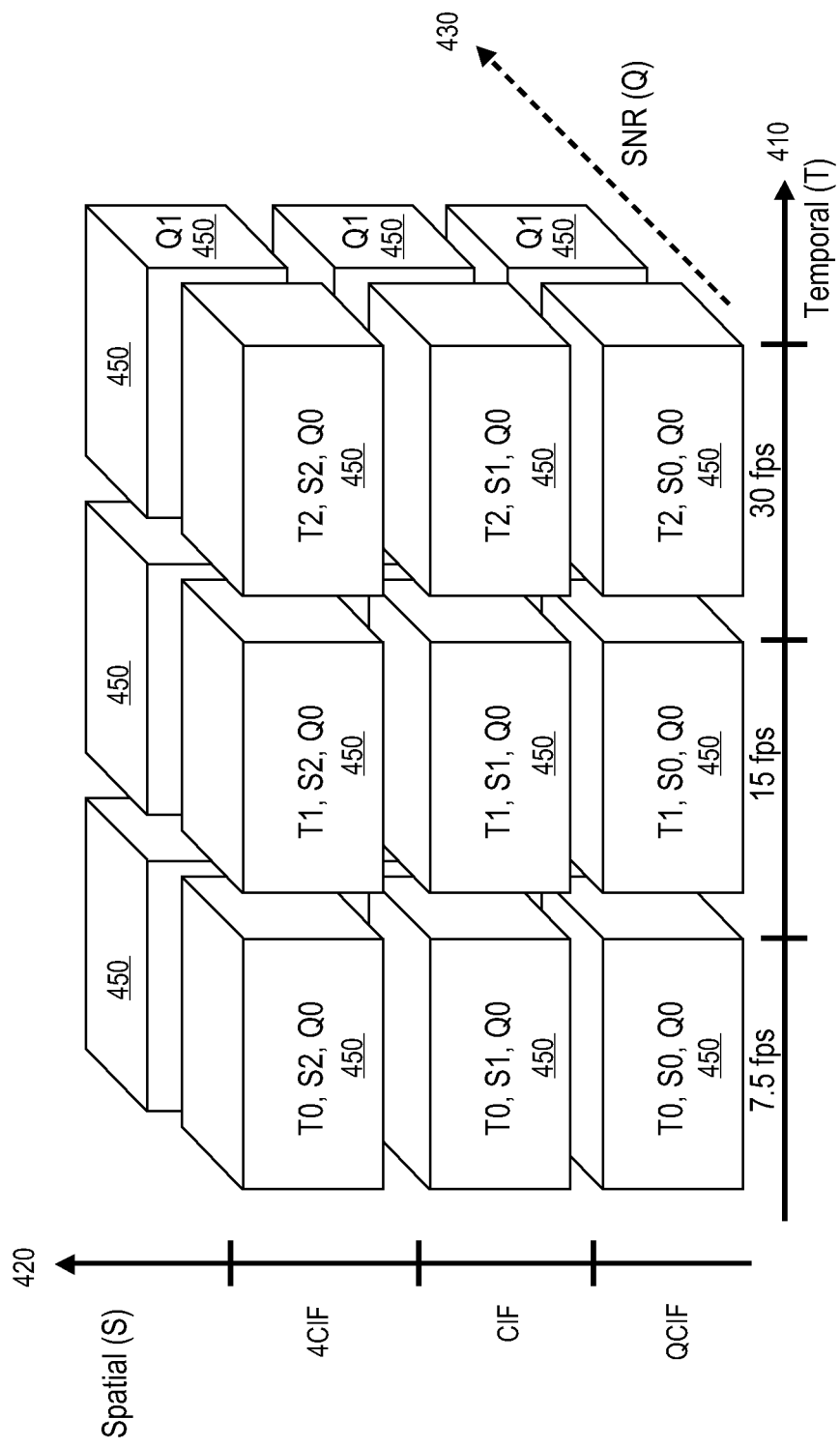
FIG. 4 illustrates an example of scalabilities in different dimensions.

An example of scalabilities in different dimensions is shown in FIG. 4. Scalabilities are enabled in three dimensions. In time dimension, frame rates with 7.5 Hz, 15 Hz or 30 Hz can be supported by temporal scalability (T) 410. When spatial scalability (S) 420 is supported, different resolutions such as QCIF (Quarter Common Intermediate Format), CIF (Common Intermediate Format) and 4CIF are enabled. For each specific spatial resolution and frame rate, the SNR (Q) layers 430 can be added to improve the picture quality. Once video content has been encoded in such a scalable way, an extractor tool may be used to adapt the actual delivered content according to application requirements, which are dependent, e.g., on the clients or the transmission channel. In the example shown in FIG. 4, each cube 450 contains the pictures with the same frame rate (temporal level), spatial resolution, and SNR layers. Better representation can be achieved by adding those cubes (pictures) 450 in any dimension. Combined scalability is supported when there are two, three, or even more scalabilities enabled.

According to the SVC specification, the pictures with the lowest spatial and quality layer are compatible with H.264/AVC, and the pictures at the lowest temporal level form the temporal base layer, which can be enhanced with pictures at higher temporal levels. In addition to the H.264/AVC compatible layer, several spatial and/or SNR enhancement layers can be added to provide spatial and/or quality scalabilities. SNR scalability is also referred to as quality scalability. Each spatial or SNR enhancement layer itself may be temporally scalable, with the same temporal scalability structure as the H.264/AVC compatible layer. For one spatial or SNR enhancement layer, the lower layer it depends on is also referred to as the base layer of that specific spatial or SNR enhancement layer.

Figure 5:
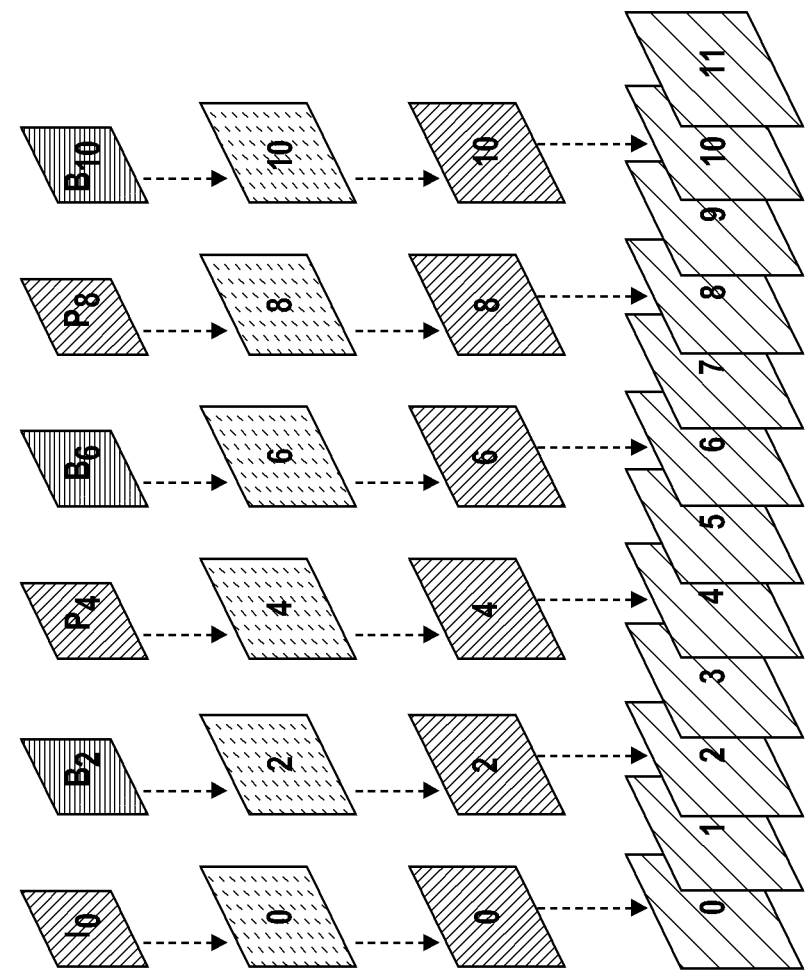
FIG. 5 illustrates an example of scalable video coding (SVC) coding structure.
Figure 5:
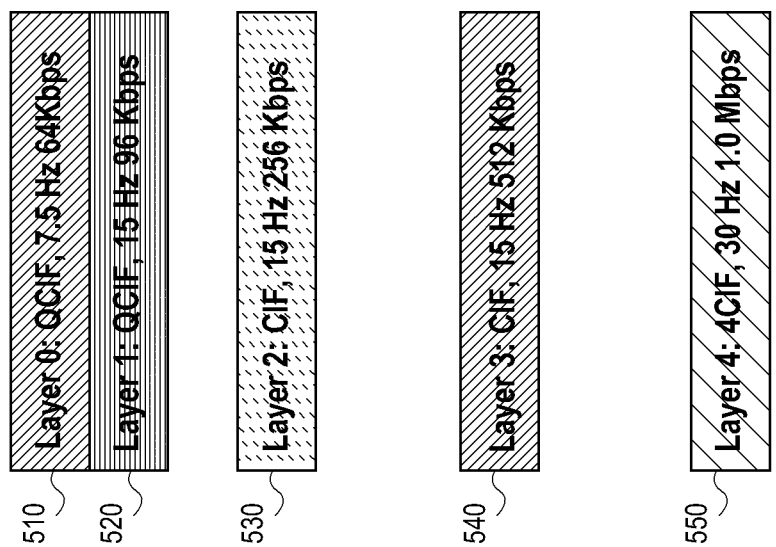

An example of SVC coding structure is shown in FIG. 5. The pictures with the lowest spatial and quality layer (pictures in layer 0 (510) and layer 1 (520), with QCIF resolution) are compatible with H.264/AVC. Among them, those pictures of the lowest temporal level form the temporal base layer, as shown in layer 0 (510) of FIG. 5. This temporal base layer (layer 0 (510)) can be enhanced with pictures of higher temporal levels (layer 1 (520)). In addition to the H.264/AVC compatible layer, several spatial and/or SNR enhancement layers can be added to provide spatial and/or quality scalabilities. For instance, the enhancement layer can be a CIF representation with the same resolution as layer 2 (530). In the example, layer 3 (540) is a SNR enhancement layer. As shown in the example, each spatial or SNR enhancement layer itself may be temporally scalable, with the same temporal scalability structure as the H.264/AVC compatible layer. Also, an enhancement layer can enhance both spatial resolution and frame rate. For example, layer 4 (550) provides a 4CIF enhancement layer, which further increases the frame rate from 15 Hz to 30 Hz.

Figure 6:
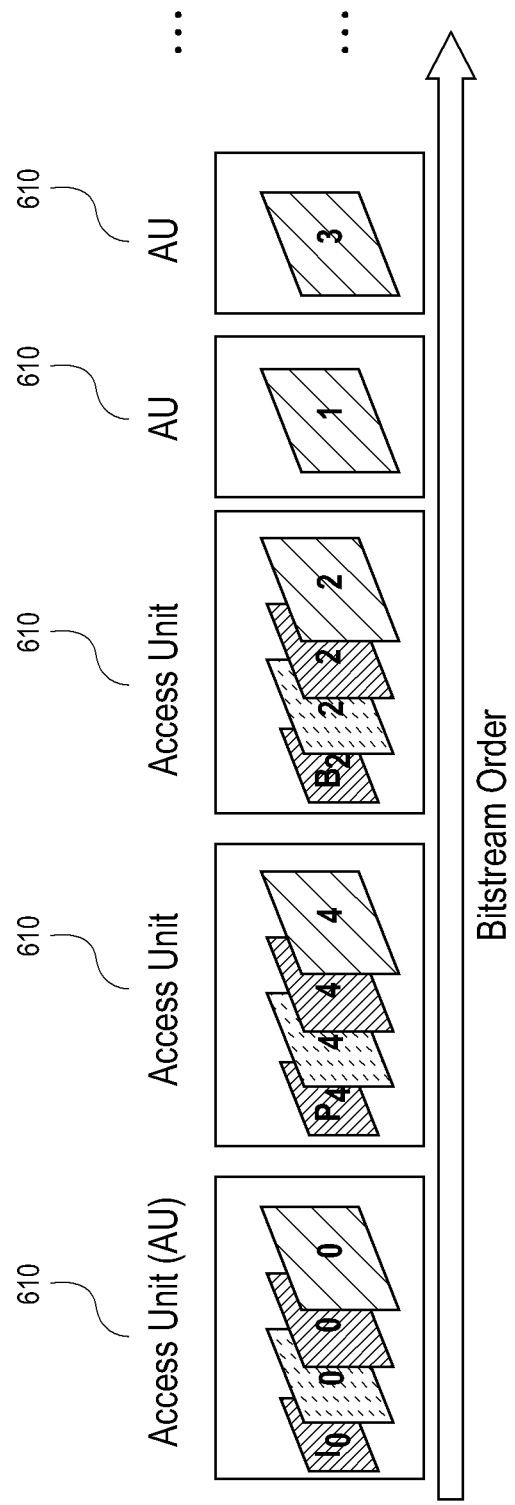
FIG. 6 illustrates an access unit in the context of SVC.

As shown in FIG. 6, the coded slices in the same time instance are successive in the bitstream order and form one access unit 610 in the context of SVC. Those SVC access units 610 then follow the decoding order, which could be different from the display order and decided, e.g., by the temporal prediction relationship.

Features of Scalable Extensions of H.264/AVC

Some functionalities of SVC are inherited from H.264/AVC. Compared with previous scalable standards, certain important features, such as inter-layer prediction and single-loop decoding, are reviewed below.

Single-Loop Decoding

To keep a low-complexity decoder, single-loop decoding is mandatory in SVC. With single-loop decoding, each supported layer can be decoded with a single motion compensation loop. To achieve this, the usage of inter-layer intra-prediction is only allowed for enhancement layer macroblocks, for which the co-located reference layer signal is intra-coded. It is further required that all layers that are used to inter-layer predict higher layers are coded using constrained intra-prediction.

Inter-Layer Prediction

SVC introduces inter-layer prediction for spatial and SNR scalabilities based on texture, residue and motion. Spatial scalability in SVC has been generalized to any resolution ratio between two layers. SNR scalability can be realized by Coarse Granularity Scalability (CGS) or Medium Granularity Scalability (MGS). In SVC, two spatial or CGS layers belong to different dependency layers (indicated by dependency_id in NAL unit header), while two MGS layers can be in the same dependency layer. One dependency layer includes quality layers with quality_id from 0 to higher values, corresponding to quality enhancement layers. In SVC, inter-layer prediction methods are utilized to reduce inter-layer redundancy. They are briefly introduced in the following paragraphs.

Inter-Layer Intra Prediction

The coding mode using inter-layer intra prediction is called "IntraBL" mode in SVC. To enable single-loop decoding, only the macroblocks (MBs), which have co-located MBs in the base layer coded as constrained intra modes, can use inter-layer intra prediction mode. A constrained intra mode MB is intra-coded without referring to any samples from neighboring inter-coded MBs.

Inter-Layer Residual Prediction

If an MB is indicated to use residual prediction, the co-located MB in the base layer for inter-layer prediction must be an inter MB and its residue may be upsampled according to the spatial resolution ratio. The residue difference between the enhancement layer and that of the base layer is coded. That is, the reconstruction of the current frame $\hat{I}_e$ of the enhancement layer equals the sum of de-quantized coefficients $r_e$ of the enhancement layer, the temporal prediction $P_e$ from the enhancement layer, and the quantization normalized residual coefficients $r_b$ of the base layer.

$$\hat{I}_e = r_e + P_e + r_b \quad (2)$$

Please note that in many implementations, the residues are buffered at picture level. Although on-the-fly residual prediction is possible, it would cost much since it needs to locate the base layer block in bitstream and parse the block again to get base block residues.

Inter-Layer Motion Prediction

The co-located base layer motion vectors may be scaled to generate predictors for the motion vectors of MB or MB partition in the enhancement layer. In addition, there is one MB type named base mode, which sends one flag for each MB. If this flag is true and the corresponding base layer MB is not intra, then motion vectors, partitioning modes and reference indices are all derived from base layer.

HEVC SVC Extension

Similar to H.264/AVC, HEVC will also have scalable video coding extension which will at least provide temporal scalability, SNR scalability and spatial scalability.

Generalized Residual Prediction for HEVC SVC and 3DV Extensions

Figure 7:
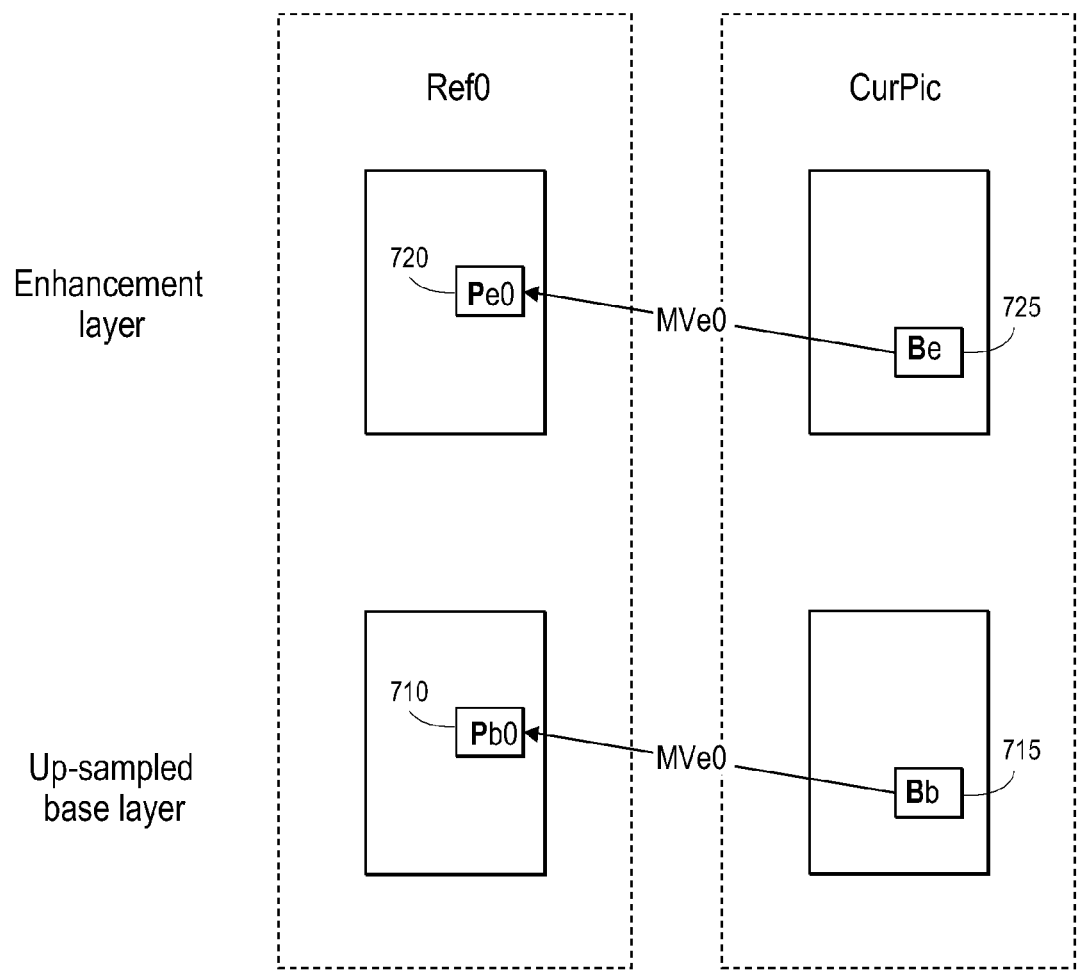
FIG. 7 illustrates a uni-prediction case of generalized residual prediction (GRP).

Generalized residual prediction (GRP) for scalable video coding and 3D video coding was described in U.S. Provisional Application No. 61/670,075, filed Jul. 10, 2012, U.S. Provisional Application No. 61/706,692, filed Sep. 27, 2012, U.S. application Ser. No. 13/933,588, filed Jul. 2, 2013, U.S. Provisional Application No. 61/680,522, filed Aug. 7, 2012, and U.S. application Ser. No. 13/957,841, filed Aug. 2, 2013, the disclosures of which are incorporated herein in their entireties by reference. In this technique, inter predicted residues of the collocated reference layer block may be used to predict those of the current block in enhancement layer. This method can be applied to inter CUs and skip mode CUs. An example of the framework of this method is shown in FIG. 7 where the case of uni-prediction is illustrated.

Let $B_e$ (725) and $B_b$ (715) denote the current block in the enhancement layer picture and its collocated reference layer block, respectively. Let $P_{e0}$ (720) denote the temporal prediction for the block $B_e$ (725) obtained by using motion vector $MV_{e0}$ (where sub-index 0 refers to reference list 0). Similarly, let $P_{b0}$ (710) represent the temporal prediction for the block $B_b$ (715) obtained by using the same motion vector $MV_{e0}$ in the up-sampled (if necessary) reference layer reference picture. Then, the inter predicted residues of the reference layer block $R_{b0}$ is obtained as:

$$R_{b0} = (B_b - P_{b0}), \quad (3)$$

Considering the temporal prediction $P_{e0}$ (720) for block $B_e$ (725), the final uni-prediction P for block $B_e$ (725) is $$P = P_{e0} + w \cdot (B_b - P_{b0}), \quad (4)$$

where w is a weighting factor, which takes the values 0, 0.5, or 1.

In some cases such as for P frames, the following variant of (4) is sometimes more efficient $$P = B_b + w \cdot (P_{e0} - P_{b0}), \quad (5)$$

where w=0.5. Therefore, four weighting modes, e.g., w=0, 0.5, and 1 in (4) and w=0.5 in (5) were proposed for GRP mode.

The weighting factor w may be signaled at CU level as a weighting index. For example, the weighting index 0, 1, 2, and 3 (or in different orders) can be used to indicate the weighting modes 0, 0.5, and 1 in (4) and w=0.5 in (5), respectively. A truncated unary code in regular CABAC mode may be used for the signaling.

Single MC Interpolation GRP

To reduce computational complexity and memory bandwidth requirement of GRP, single MC interpolation was described in U.S. Provisional Application No. 61/731,448, filed Nov. 29, 2012, which is incorporated herein in its entirety by reference. In the application, (4) is rewritten into (6), namely $$P=(P_{e0}-w\cdot P_{b0})+w\cdot B_b \quad (6)$$

Considering $P_{e0}$ and $P_{b0}$ share the same motion, MC interpolation can be directly applied to the differential block ($P_{e0}-w\cdot P_{b0}$) so that the number of MC interpolation is reduced from two to one. Consequently, both computational complexity and memory access is reduced.

High-Level Syntax Only SHVC

In high-level syntax only SHVC, there is no new block level coding tool when compared to HEVC single layer coding. Only slice and above level syntax changes and picture level operation such as picture filtering or up-sampling are allowed in this approach.

To reduce the redundancy between layers, up-sampled collocated reference layer picture is put into the reference buffer of enhancement layer so that inter-layer prediction is achieved in the same way as inter-frame prediction in the same layer. In the current working draft ([5] Chen, "SHVC Working Draft 1") and test model ([6] Chen, "SHVC Test Model 1") of SHVC, the inter-layer reference picture is marked as long term reference picture. The motion vector difference of inter-layer reference is constrained to zero.

GRP Mimicking in High-Level Syntax Only SHVC

GRP may be mimicked in high-level syntax only SHVC or multi-view HEVC as described below. Additional details are described in U.S. Provisional Application No. 61/708,011, filed Sep. 30, 2012, U.S. Provisional Application No. 61/749,874, filed Jan. 7, 2013, and U.S. application Ser. No. 14/040,290, filed Sep. 27, 2013, the disclosures of which are incorporated herein in their entireties by reference.

Generation of GRP Reference Pictures

GRP can be realized in high level syntax only SHVC by mimicking block level GRP prediction with bi-directional prediction framework. In this case, only uni-directional GRP prediction can be mimicked. Currently, there are three GRP uni-prediction modes (e.g., (3)-(5)) as follows:

$$P = P_{e0} + \frac{1}{2}\cdot(B_b - P_{b0}) = \frac{(2\cdot P_{e0} - P_{b0}) + B_b}{2} \quad (7)$$

$$P = P_{e0} + (B_b - P_{b0}) = \frac{2\cdot(P_{e0} - P_{b0}) + 2\cdot B_b}{2} \quad (8)$$

$$P = B_b + \frac{1}{2}\cdot(P_{e0} - P_{b0}) = \frac{(P_{e0} - P_{b0}) + 2\cdot B_b}{2} \quad (9)$$

Here, $B_b$ indicates the inter-layer reference for the current picture. For a GRP reference picture, the POC and the motion information should be the same as those of the enhancement reference picture which is used to generate the GRP reference.

Generation of Predefined GRP Reference Pictures

To keep a reasonable dynamic range of pixel samples in differential pictures, two types of GRP reference pictures are defined as follows:

$$RG_{half}=\min(\max(0,2\cdot P_{e0}-P_{b0}),2^{bitdepth}-1) \quad (10)$$

$$RG_{one}=\min(\max(0,P_{e0}-P_{b0}+2^{bitdepth-1}),2^{bitdepth}-1) \quad (11)$$

In general, $RG_{half}$ and $RG_{one}$ can be generated whenever both an enhancement layer reference picture and an (up-sampled) collocated reference layer picture are available.

To mimic uni-directional GRP prediction in (7), $$P = \frac{(2\cdot P_{e0} - P_{b0}) + B_b}{2} = \frac{RG_{half} + B_b}{2} \quad (12)$$

Basically, when $RG_{half}$ and $B_b$ are used as a reference picture, GRP in (7) can be easily mimicked.

For uni-directional GRP prediction in (8), $$P = \frac{2\cdot(P_{e0} - P_{b0}) + 2\cdot B_b}{2}$$

$$= \frac{(2\cdot RG_{one} - 2^{bitdepth-1}) + (2\cdot B_b - 2^{bitdepth-1})}{2} \quad (13)$$

For this case, additional weighting 2 and offset $-2^{bitdepth-1}$ for both $RG_{one}$ and $B_b$ need to be signaled with weighted prediction parameters syntax ([2] Bross, "HEVC Specification Draft 10").

For uni-directional GRP prediction in (9), $$P = \frac{(P_{e0} - P_{b0}) + 2\cdot B_b}{2} = \frac{(RG_{one}) + (2\cdot B_b - 2^{bitdepth-1})}{2} \quad (14)$$

For this case, additional weighting 2 and offset $-2^{bitdepth-1}$ for $B_b$ need to be signaled with weighted prediction parameters syntax ([2] Bross "HEVC Specification Draft 10").

In general, for each enhancement reference picture, GRP reference $RG_{half}$ and $RG_{one}$ can be generated and placed into a reference picture list to mimic GRP. However, how many GRP reference pictures are used when coding a picture may depend on encoder optimization.

Marking of GRP Reference Pictures

Differential pictures are stored in the DPB. A difference picture reference picture set (DPRPS) is created as follows:

For each picture in RefPicSetLtCurr, RefPicSetLtFoll, RefPicSetStCurrBefore, RefPicSetStCurrAfter or RefPicSetStFoll, its difference picture is inserted into DPRPS.

All other difference pictures not in DPRPS are removed from the DPB.

Entries in DPRPS may be further selected to decide which pictures can be used to predict the current picture. For example, only the pictures closest to the current picture are chosen to be the form a currDiffRPS. In one alternative, currDiffRPS is equal to DPRPS.

In addition, more difference pictures may be removed from DPRPS.

A currDiffRPS is used to form reference picture lists similar to inter-layer reference picture set.

Entries in currDiffRPS are marked as short-term reference pictures.

Signaling and Management of Generalized Residual Prediction in High-Level Syntax Only SHVC This disclosure can address solutions for defining how to efficiently signal and manage GRP reference pictures. Further, in the current SHVC framework, only one inter-layer reference picture is generated and used when coding the current picture in an enhancement layer. This disclosure provides a description of how to provide an efficient way to manage multiple inter-layer reference pictures.

The techniques described in this disclosure may generate GRP reference pictures and place them into reference picture lists of the enhancement layer. A GRP reference picture can share the same motion information and POC as the enhancement layer reference picture based on which the GRP reference picture is generated. For example, the POC number and the motion field of the enhancement layer reference picture based on which the GRP reference picture is generated are copied to the GRP reference picture. As explained above, the POC can refer to a value associated with a picture that indicates the order of output of the picture. The POC number can be used to identify a reference picture. Motion field may refer to motion information relating to various blocks in a picture and can include one or more motion vectors. The GRP reference picture is generated based on the copied POC number and the motion field from the enhancement layer reference picture. The GRP reference picture generated in this manner can be stored in the reference picture list.

In this disclosure, GRP references and other video data (e.g., enhancement layer reference, current picture to be reconstructed, etc.) are explained in terms of pictures, but the techniques can also apply to other units of video data (e.g., frame, etc.). For instance, the techniques can apply to GRP reference frames, enhancement layer reference frames, current frame, etc. In the case of progressive coding, a picture and a frame can be the same.

Figure 8:
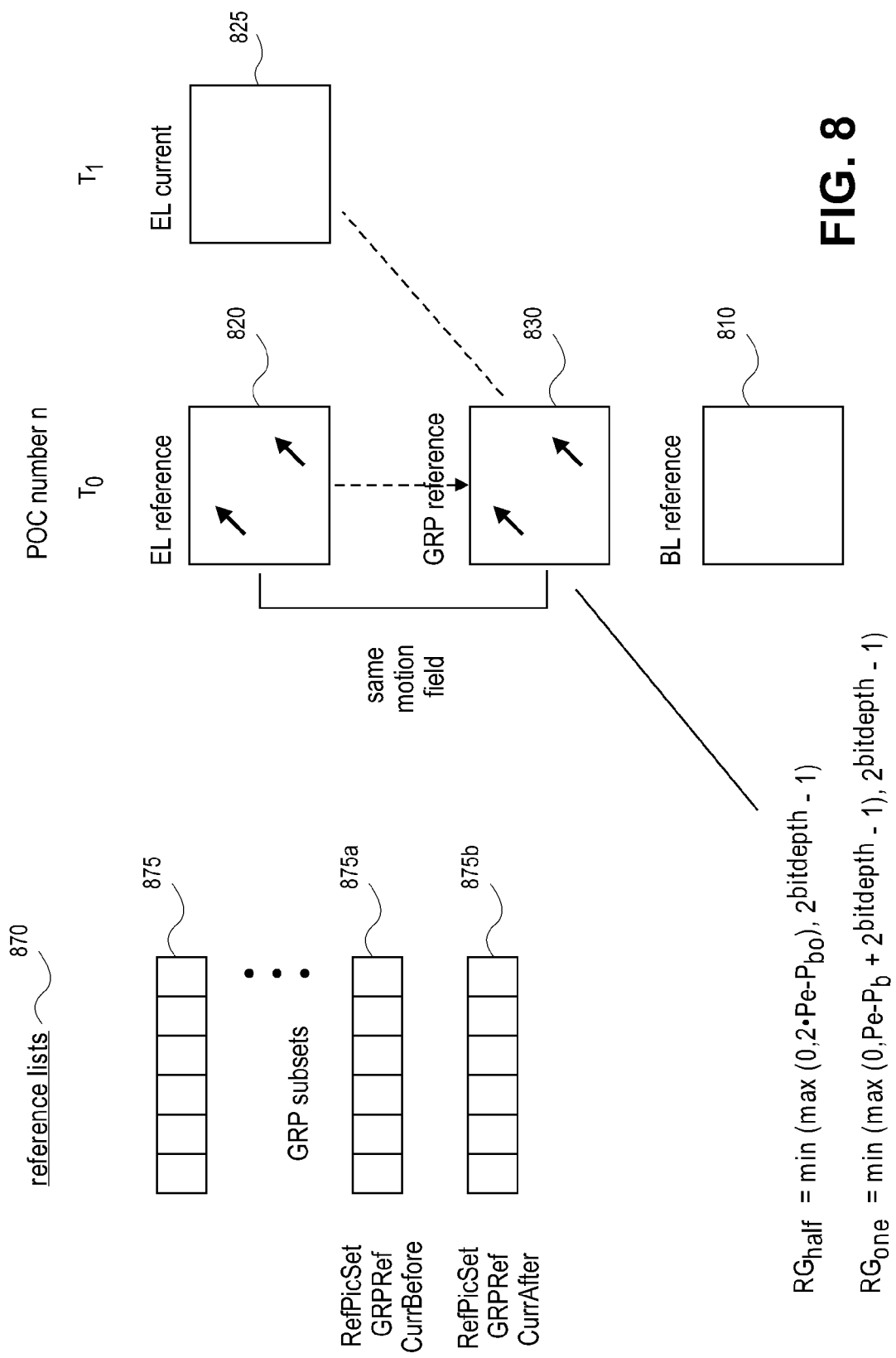
FIG. 8 is a block diagram illustrating generation of residual prediction reference pictures, according to aspects of this disclosure.

FIG. 8 is a block diagram illustrating generation of residual prediction reference pictures, according to aspects of this disclosure. FIG. 8 shows a base layer ("BL") reference 810, an enhancement layer ("EL") reference 820, and a GRP reference 830 for time T0. The BL reference 810 may be a reference from the base layer associated with the enhancement layer (e.g., upsampled). As explained above, the GRP reference 830 can be generated based on the corresponding EL reference 820. In one embodiment, the EL reference 820 has POC number n. The BL reference 810 also has the same POC number n. The EL reference 820 has a motion field associated with it, which includes motion vectors. The GRP reference 830 is generated based on the EL reference 820 such that it has the same POC number n as the EL reference 820 and has the same motion field as the EL reference 820. This can be done by copying the POC number n and the motion field from the EL reference 820. The GRP reference 830 can be stored in the reference lists 870 (e.g., in specific subsets for GRP references 830). The EL current picture or frame 825 for time T1 can be reconstructed based on the GRP reference 830. Time T1 is later than time T0. The GRP references 830 may be generated, but not output. For example, a GRP reference 830 may be used in prediction to generate a reconstruction of a picture, but may not itself be output to a display device.

In one embodiment, there can be two types of GRP references 830, and the GRP reference pictures 830 may be generated as explained above, e.g., based on equations (10) and (11). $RG_{half}$, $RG_{one}$, or both may be generated, depending on the embodiment. $RG_{half}$ and $RG_{one}$ can reflect different weighting factors. For example, $RG_{half}$ can reflect a weighting of 0.5, and $RG_{one}$ can reflect a weighting of 1; $RG_{half}$ may mimic block-level GRP with a weighting factor of 0.5, and $RG_{one}$ may mimic block-level GRP with a weighting factor of 1. In one embodiment, to mimic block-level GRP with weighting 0.5 shown in equation (7), $RG_{half}$ is used as shown in (12). In another embodiment, to mimic-block level GRP with weighting 1 shown in equation (8), $RG_{one}$ is used as shown in equation (13). In yet another embodiment, $RG_{one}$ can also be used to reflect a weighting of 0.5. For example, to mimic block-level GRP with weighting 0.5 shown in equation (9), $RG_{one}$ is used as shown in expression (14).

Using GRP reference pictures 830 can allow incorporation of weighted residual prediction at the block level in high-level syntax only SHVC. For example, the weighting factor used in GRP is already applied to the GRP reference pictures 830 that may be used for prediction. The GRP reference pictures 830 can share the same motion field and the POC as the enhancement layer reference pictures 820 from which they are derived or generated. Having the GRP references 830 share the same motion field and POC as the corresponding enhancement layer reference pictures 820 can lead to better prediction results. Generally, an enhancement layer reference picture 820 has a better quality motion field, and therefore, copying the motion field of the EL reference picture 820 can provide better prediction results. Since the GRP reference 830 pictures have the same POC as the EL reference picture 820, there can be more reference pictures available for the same POC, which can lead to better prediction results.

The techniques may also signal information relating to GRP reference pictures 830. The techniques may signal whether GRP reference pictures 830 will be used, e.g., in the video parameter set (VPS) or SPS. The techniques may also signal how GRP reference pictures 830 are generated (e.g., based on which short-term reference and with what weighting type). In general, only one reference picture is available for a POC. Since multiple reference pictures can be available with the generation of GRP references 830, which reference pictures to use can be signaled in the bitstream. A conforming constraint that all slices belonging to the same picture should share the same GRP reference information may be applied.

The techniques can manage GRP reference by creating two additional RPS subsets for GRP reference pictures, RefPicSetGRPRefCurrBefore 875a and RefPicSetGRPRefCurrAfter 875b. These two subsets can be managed in a similar manner as RefPicSetStCurrBefore and RefPicSetStCurrAfter. Only GRP reference pictures 830 can be put into these two subsets. Moreover, GRP reference pictures 830 may not be placed in other subsets. A conforming restriction that GRP reference pictures 830 can only be used for the current pictures 825 may be applied so that the GRP reference pictures 830 will not be stored in the DPB.

Various conforming restrictions may be applied on the usage of GRP reference pictures. For example, a conforming restriction that GRP reference pictures 830 must be used as a pair (GRP reference and inter-layer reference) in bi-prediction may be applied.

The techniques for GRP reference management may also be applied to other generated pictures such as up-sampled reference layer pictures. For example, how to generate/upsample the collocated reference layer picture can be signaled in the bitstream, e.g., in the slice header. A conforming restriction that any generated picture can only be used for the current picture 825 may be applied so that the generated pictures will not be stored in the DPB.

In this manner, the techniques can define how to efficiently signal and manage GRP reference pictures 830, as explained further below.

Tool Enabling/Control Signaling

The techniques can signal a flag in the VPS (for each enhancement layer) or SPS to indicate whether GRP reference pictures 830 will be used for the layer. For example, following syntax may be added to the SPS.

| |  |
|---|---|
| if( sps_extension_flag ) | |
|     grp_ref_enabled_flag | u(1) | grp_ref_enabled_flag equal to 1 specifies that GRP references 830 will be used in the layer. grp_ref_enabled_flag equal to 0 specifies that GRP references 830 will not be used in the layer. When grp_ref_enabled_flag is not present, it is inferred to 0.

Signaling of GRP Reference Pictures

The techniques can signal the usage information of GRP reference pictures 830 in bitstreams, e.g., in the picture parameter set (PPS), slice header, and RPS. Various embodiments of signaling GRP reference pictures 830 are described below.

Embodiment 1

In one embodiment, the number of GRP reference pictures 830 with predefined types ($RG_{half}$ and $RG_{one}$) for the current pictures 825 is signaled in the slice header or PPS. The signaled number may be the total number of $RG_{half}$ and $RG_{one}$ (e.g., the total number of $RG_{half}$ and $RG_{one}$ combined). Alternatively, both numbers may be signaled (e.g., the number of $RG_{half}$ and the number of $RG_{one}$ can be signaled separately). In this embodiment, $RG_{half}$ and $RG_{one}$ are generated for each short-term reference picture of the current picture 825 and placed into RefPicSetGRPRefCurrBefore 875a and RefPicSetGRPRefCurrAfter 875b until the signaled number(s) of GRP reference pictures 830 is(are) reached. When both $RG_{half}$ and $RG_{one}$ are generated for the same short-term reference picture, $RG_{half}$ is placed before $RG_{one}$. This embodiment can signal only the number of GRP references 830 to be generated, and both $RG_{half}$ and $RG_{one}$ can be generated (e.g., as predefined) until the signaled number of GRP references 830 is reached.

Embodiment 2

In this embodiment, the GRP reference pictures 830 are signaled in the slice header as follows:

| slice_segment_header( ) { | Descriptor |
|---|---|
|   first_slice_segment_in_pic_flag | u(1) |
|   if( RapPicFlag ) | |
|     no_output_of_prior_pics_flag | u(1) |
|   slice_pic_parameter_set_id | ue(v) |
|   if( !first_slice_segment_in_pic_flag ) { | |
|     if(dependent_slice_segments_enabled_flag ) | |
|       dependent_slice_segment_flag | u(1) |
|     slice_segment_address | u(v) |
|   } | |
|   if( !dependent_slice_segment_flag ) { | |
|     for ( i = 0; i < num_extra_slice_header_bits; i++ ) | |
|       slice_reserved_flag[ i ] | u(1) |
|     slice_type | ue(v) |
|     if( output_flag_present_flag ) | |
|       pic_output_flag | u(1) |
|     if( separate_colour_plane_flag = = 1 ) | |
|       colour_plane_id | u(2) |
|     if( !IdrPicFlag ) { | |
|       pic_order_cnt_lsb | u(v) |
|       short_term_ref_pic_set_sps_flag | u(1) |
|       if( !short_term_ref_pic_set_sps_flag ) | |
|   short_term_ref_pic_set( num_short_term_ref_pic_sets ) | |
|       else if( num_short_term_ref_pic_sets > 1 ) | |
|         short_term_ref_pic_set_idx | u(v) |
|       if(grp_ref_enabled_flag) { | |
|         for( i = 0; i < num_negative _pics; i+ + ) | |
|         if ( used_by_curr_pic_s0_flag[ i ] ) | |
|           grp_ref_s0_flag[ i ] | u(1) |
|         for( i = 0; i < num_positive_pics; i+ + ) | |
|         if ( used_by_curr_pic_s1_flag[ i ] ) | |
|           grp_ref_s1_flag[ i ] | u(1) |
|       } | |
|       if( long_term_ref_pics_present_flag ) { | |
| ... | |
|   byte_alignment( ) | |
| } | | grp_ref_s0_flag[i] and grp_ref_s1_flag[i] specify whether a GRP reference picture will be generated based on short-term reference pictures. When grp_ref_s0_flag[i] (grp_ref_s1_flag[i]) is equal to 0, no GRP reference picture will be generated based on the short-term reference picture. When grp_ref_s0_flag[i] (grp_ref_s1_flag[i]) is equal to 1, $RG_{half}$ will be generated based on the short-term reference picture. Alternatively, when grp_ref_s0_flag[i] (grp_ref_s1_flag[i]) is equal to 1, $RG_{one}$ will be generated based on the short-term reference picture. When grp_ref_s0_flag[i] and grp_ref_s1_flag[i] are not present, they are inferred to 0. In this embodiment, only one or the other type of two GRP reference types will be generated. Which type of GRP reference to use can be predefined. For example, only $RG_{half}$ is used or only $RG_{one}$ is used when grp_ref_s0_flag[i] (grp_ref_s1_flag[i]) is equal to 1.

Embodiment 3

In this embodiment, the GRP reference pictures 830 are signaled in the slice header as follows:

| slice_segment_header( ) { | Descriptor |
|---|---|
|   first_slice_segment_in_pic_flag | u(1) |
|   if( RapPicFlag ) | |
|     no_output_of_prior_pics_flag | u(1) |
|   slice_pic_parameter_set_id | ue(v) |
|   if( !first_slice_segment_in_pic_flag ) { | |
|     if(dependent_slice_segments_enabled_flag ) | |
|       dependent_slice_segment_flag | u(1) |
|     slice_segment_address | u(v) |
|   } | |
|   if( !dependent_slice_segment_flag ) { | |
|     for ( i = 0; i < num_extra_slice_header_bits; i++ ) | |
|       slice_reserved_flag[ i ] | u(1) |
|     slice_type | ue(v) |
|     if( output_flag_present_flag ) | |
|       pic_output_flag | u(1) |
|     if( separate_colour_plane_flag = = 1 ) | |
|       colour_plane_id | u(2) |
|     if( !IdrPicFlag ) { | |
|       pic_order_cnt_lsb | u(v) |
|       short_term_ref_pic_set_sps_flag | u(1) |
|       if( !short_term_ref_pic_set_sps_flag ) | |
|   short_term_ref_pic_set( num_short_term_ref_pic_sets ) | |
|       else if( num_short_term_ref_pic_sets > 1 ) | |
|         short_term_ref_pic_set_idx | u(v) |
|       if(grp_ref_enabled_flag) { | |
|         for( i = 0; i < num_negative_pics; i+ + ) | |
|         if ( used_by_curr_pic_s0_flag[ i ] ) | |
|           grp_ref_s0_idc[ i ] | ue(v) |
|         for( i = 0; i < num_positive_pics; i+ + ) | |

-continued

| | Descriptor |
|---|---|
| slice_segment_header( ) { | |
| ... | |
| if ( used_by_curr_pic_s1_flag[ i ] ) | |
| grp_ref_s1_idc[ i ] | ue(v) |
| } | |
| if( long_term_ref_pics_present_flag ) { | |
| ... | |
| byte_alignment( ) | |
| } | | grp_ref_s0_idc[i] and grp_ref_s1_idc[i] specify how GRP reference pictures 830 are generated based on the short-term reference picture. When grp_ref_s0_idc[i] (grp_ref_s1_idc[i]) is equal to 0, no GRP reference picture will be generated based on the short-term reference picture. When grp_ref_s0_idc[i] (grp_ref_s1_idc[i]) is equal to 1, $RG_{half}$ will be generated based on the short-term reference picture. When grp_ref_s0_idc[i] (grp_ref_s1_idc[i]) is equal to 2, $RG_{one}$ will be generated based on the short-term reference picture. When grp_ref_s0_idc[i] (grp_ref_s1_idc[i]) is equal to 3, both $RG_{half}$ and $RG_{one}$ will be generated based on the short-term reference picture. When grp_ref_s0_idc[i] and grp_ref_s1_idc[i] are not present, they are inferred to 0. grp_ref_s0_idc[i] and grp_ref_s1_idc[i] may be coded with 2-bit fixed coding or truncated unary coding.

In this embodiment, all types of GRP references 830 can be generated. Depending on the value of grp_ref_s0_idc[i] (grp_ref_s1_idc[i]), $RG_{half}$ or $RG_{one}$, or both, or none can be created, as explained above. This embodiment may signal more information than Embodiments 1, 2, and 4.

Embodiment 4

As a tradeoff between coding efficiency and complexity, GRP references 830 may only be generated based on some of the short term reference pictures. In one embodiment, GRP reference information may be signaled in the slice header as follows:

| | Descriptor |
|---|---|
| slice_segment_header( ) { | |
| ... | |
| if( slice_type == P \|\| slice_type == B ) { | |
| if(grp_ref_enabled_flag) | |
| one_grp_ref_in_one_list | u(1) |
| num_ref_idx_active_override_flag | u(1) |
| if( num_ref_idx_active_override_flag ) { | |
| num_ref_idx_l0_active_minus1 | ue(v) |
| if( slice_type == B ) | |
| num_ref_idx_l1_active_minus1 | ue(v) |
| } | |
| ... | |
| byte_alignment( ) | |
| } | | one_grp_ref_in_one_list equal to 1 specifies that one GRP reference picture will be generated based on the first short-term reference picture in list0 for P slice and two GRP reference pictures 830 will be generated base on the first short-term reference pictures in list0 and list1 for B slice (each list has one GRP reference). one_grp_ref_in_one_list equal to 0 specifies that no GRP reference picture will be generated for this slice. When one_grp_ref_in_one_list is not present, it is inferred to 0. This embodiment generates GRP reference pictures 830 for only the first short-term reference pictures in the list0 and/or list1, and therefore, can reduce the amount of signaling. The type of GRP reference picture that is generated can be predefined (e.g., $RG_{half}$ or $RG_{one}$).

GRP Reference Management

The techniques may also provide ways to manage GRP reference pictures 830 in an efficient manner.

Reference List Initialization with GRP Reference Pictures

In one embodiment, two new subsets are provided for GRP reference pictures 830, in addition to the five subsets 875 of RPS. The two new subsets 875*a*, *b* may be referred to as RefPicSetGRPRefCurrBefore 875*a* and RefPicSetGRPRefCurrAfter 875*b*. GRP reference pictures 830 may only be added into these two subsets 875*a*, *b*.

RefPicSetGRPRefCurrBefore 875*a* consists of all GRP reference pictures 830 that have a smaller POC than the current picture 825. The list is initialized in a descending order of POC value. When two GRP reference pictures 830 share the same POC, the one with GRP reference type $RG_{half}$ is placed first. Or alternatively, $RG_{one}$ is placed first.

RefPicSetGRPRefCurrAfter 875*b* consists of all GRP reference pictures 830 that have a larger POC than the current picture 825. The list is initialized in an ascending order of POC value. When two GRP reference pictures 830 share the same POC, the one with GRP reference type $RG_{half}$ is placed first. Or alternatively, $RG_{one}$ is placed first.

When initializing reference lists, entries in RefPicSetGRPRefCurrBefore 875*a* and RefPicSetGRPRefCurrAfter 875*b* are sequentially inserted after those in RefPicSetLtCurr. Alternatively, entries in RefPicSetGRPRefCurrBefore 875*a* and RefPicSetGRPRefCurrAfter 875*b* are sequentially inserted before those in RefPicSetLtCurr 875*b*.

Conforming Restrictions on Usage of GRP Reference Pictures

One of the purposes of generating a GRP reference picture is to mimic GRP coding mode in high-level syntax only SHVC. Consequently, it can be further constrained that GRP reference pictures 830 can only be used together with the related up-sampled reference layer picture in bi-directional prediction, as shown in (12), (13) and (14). This can lead to better prediction results.

Another conforming restriction may be applied that the generated GRP reference picture 830 can only be used for the current picture 825 so that they will not be put into the DPB after the current picture 825 is decoded.

Management of Other Generated Inter-Layer Reference Pictures

Similar to GRP reference pictures 830, inter-layer reference pictures may not be decoded pictures, but may be generated based on collocated reference layer picture. Techniques relating to GRP reference pictures 830 may also be used for inter-layer reference pictures.

In one embodiment, adaptive up-sampling filter or second up-sampling filter is enabled. Consequently, there may be more than one version of inter-layer reference pictures for the current picture 825. When initializing reference lists, the inter-layer picture from the closet reference layer should be inserted first. When inter-layer pictures are from the same reference layer, the one generated by adaptive up-sampling filter or second up-sampling filter should be inserted after the one generated with the default up-sampling filter.

Moreover, the number of inter-layer reference pictures may be signaled in the bitstream, e.g. in the SPS, PPS, slice header, or RPS. Another conforming restriction may be applied that all inter-layer reference pictures can only be used for the current picture 825 so that they will not be put into DPB after the current picture 825 is decoded.

Figure 9:
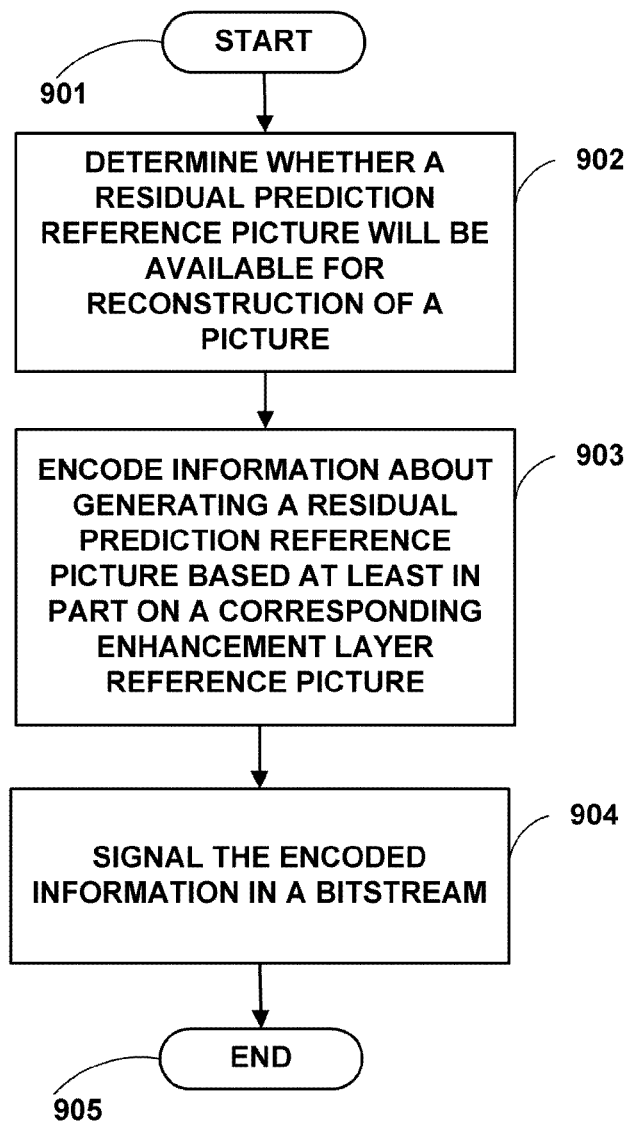
FIG. 9 is a flowchart illustrating an example method for generating residual prediction reference pictures and signaling related information, according to aspects of this disclosure.

FIG. 9 is a flowchart illustrating an example method for generating residual prediction reference pictures and signaling related information, according to aspects of this disclosure. The process 900 may be performed by an encoder (e.g., the encoder as shown in FIG. 2, etc.), a decoder (e.g., the decoder as shown in FIG. 3, etc.), or any other component. The blocks of the process 900 are described with respect to the encoder 20 in FIG. 2, but the process 900 may be performed by other components, such as a decoder, as mentioned above. All embodiments described with respect to FIG. 9 may be implemented separately, or in combination with one another. Certain details relating to the process 900 are explained above, e.g., with respect to FIG. 8.

As explained above, the GRP reference picture can also be referred to as a residual prediction reference picture ("RPRP"). The process 900 starts at block 901. At block 902, the encoder 20 determines whether a residual prediction reference picture will be available for reconstruction of a picture at a decoder. The encoder 20 may make the decision based on various factors, such as rate-distortion tradeoff, computational complexity, memory access, requirements, encoder optimization, etc. In certain embodiments, a unit of video other than a picture may be reconstructed, such as a group of slices, a slice, etc.

At block 903, the encoder 20 encodes information about generating a residual prediction reference picture. The information can include information on how to generate a residual prediction reference picture based at least in part on a corresponding enhancement layer reference picture associated with an enhancement layer. For instance, the residual prediction reference picture can be generated based on an enhancement layer reference picture from the enhancement layer. The residual prediction reference picture may be configured to have the same motion field and the same picture order count (POC) as the enhancement layer reference picture from which it is to be generated. The information can include whether use of residual prediction reference pictures is enabled or not. For example, the encoder 20 can encode a flag that indicates that usage of residual prediction reference pictures is enabled or not.

The encoder 20 can signal the information in various ways as explained above. In some embodiments, the decoder can be preconfigured to generate residual prediction reference pictures in a certain way (e.g., generate only $RG_{half}$, only $RG_{one}$, or both), and the encoder 20 only signals the number of residual prediction reference pictures to generate. In other embodiments, the decoder is preconfigured to generate a residual prediction reference picture of a certain type (e.g., generate only $RG_{half}$ or $RG_{one}$), and the encoder 20 signals one or more syntax elements that indicate whether the residual prediction reference picture of that certain type should be generated or not. For example, if a flag indicates a value of 1, it means generate the residual prediction reference picture of the predefined type, and if the flag indicates a value of 0, it means do not generate the residual prediction reference picture of the predefined type.

In certain embodiments, the decoder is configured to generate residual prediction reference pictures of different types, and the encoder 20 signals one or more syntax elements that indicate whether a residual prediction reference picture should be created and which type of residual prediction reference picture should be created. For example, a flag can indicate multiple values, and each value can be associated with which type(s) of residual prediction reference picture to create. In Embodiment 3 above, 0 means do not generate residual prediction reference pictures, 1 means generate $RG_{half}$, 2 means generate $RG_{one}$, and 3 means generate both $RG_{half}$ and $RG_{one}$.

In some embodiments, the decoder can be configured to generate a residual prediction reference picture based only on the first short-term reference picture in a reference picture list. The encoder 20 signals only whether to generate the residual prediction reference picture or not. For example, a flag have a value of 1 to indicate that the residual prediction reference picture should be generated, and a value of 0 to indicate that the residual prediction reference picture should not be generated.

The information may also include information relating to various constraints or conforming restrictions. Examples of such constraints or conforming restrictions can include:

- Slices belonging to the same picture should share the same GRP reference information. For example, all slices of a picture have the same GRP references in the reference list.
- GPR references should be used in pairs. For example, a picture of an enhancement layer should be reconstructed based on at least two GRP references.
- A GRP reference picture should be used with an inter-layer reference picture. For example, a picture of an enhancement layer should be reconstructed based on a GRP reference picture and an upsampled collocated reference picture of a reference layer. The reference layer can correspond to the enhancement layer associated with the enhancement layer reference picture based on which the GRP reference picture is generated.
- A GPR reference picture may only be used for a current picture so that it is not placed in the DPB.

These constraints can be decoded or inferred at the decoder and applied in generation of residual prediction reference pictures.

At block 904, the encoder 20 signals the encoded information in a bitstream. The encoded information can be signaled to a decoder to be decoded. The information can be specified at a slice or above level. For example, the encoded information can be specified in a picture parameter set (PPS), a video parameter set (VPS), a sequence parameter set (SPS), a reference parameter set (RPS), a slice header, etc. Certain details relating to decoding of the signaled information are explained below with respect to FIG. 10. The process 900 ends at block 905.

The encoder 20 can include a memory unit that is configured to store at least one reference picture list associated with one or more layers of video information in scalable video coding. The encoder 20 may generate and/or store a residual prediction reference picture, e.g., to refer to in the process of encoding the information about generating the residual prediction reference picture.

Figure 10:
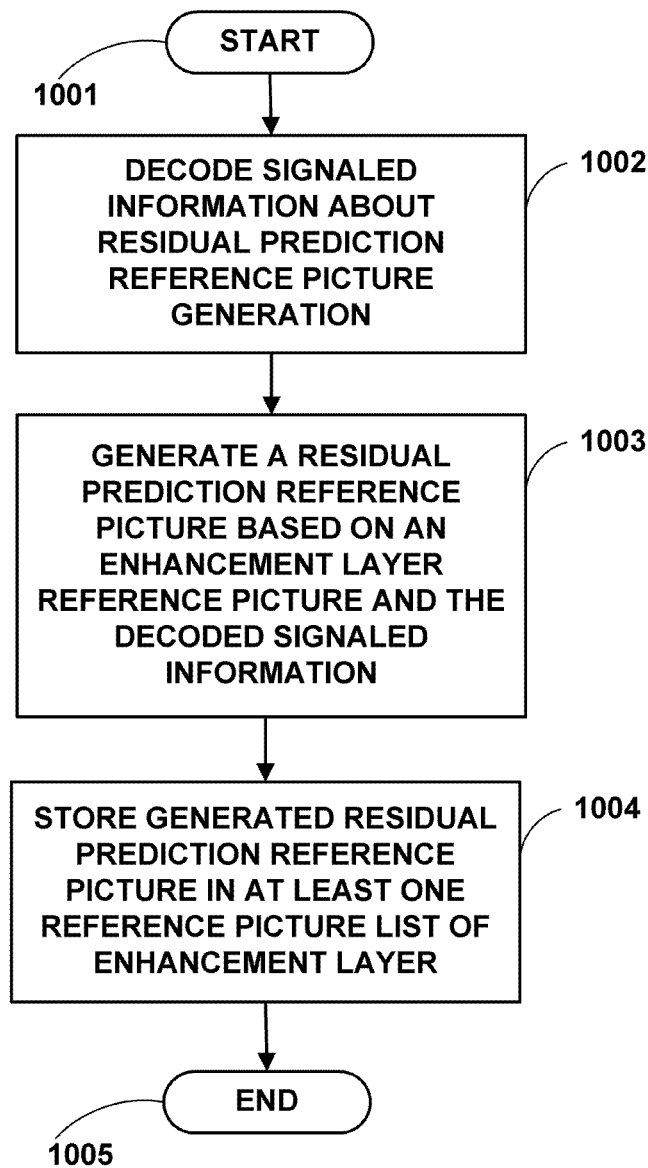
FIG. 10 is a flowchart illustrating an example method for generating residual prediction reference pictures based on signaled information, according to aspects of this disclosure.

FIG. 10 is a flowchart illustrating an example method for generating residual prediction reference pictures based on signaled information, according to aspects of this disclosure. The process 1000 may be performed by an encoder (e.g., the encoder as shown in FIG. 2, etc.), a decoder (e.g., the decoder as shown in FIG. 3, etc.), or any other component. The blocks of the process 1000 are described with respect to the decoder 30 in FIG. 3, but the process 1000 may be performed by other components, such as an encoder, as mentioned above. All embodiments described with respect to FIG. 10 may be implemented separately, or in combination with one another. Certain details relating to the process 1000 are explained above, e.g., with respect to FIGS. 8 and 9.

The process 1000 starts at block 1001. At block 1002, the decoder 30 decodes signaled information about residual prediction reference picture generation. The signaled information may include information explained above with respect to FIG. 9. For example, the signaled information can indicate whether to generate a residual prediction reference picture and/or which type of residual prediction reference picture to generate. Depending on the embodiment, the information included in the signaled information can vary. Several embodiments are described in connection with FIG. 9, and the signaled information can include any of the information in these various embodiments.

The signaled information can include whether use of residual prediction reference pictures is enabled or not. For example, a flag may indicate that usage of residual prediction reference pictures is enabled or not. The signaled information can be specified at a slice or above level. For example, the signaled information can be specified in a picture parameter set (PPS), a video parameter set (VPS), a sequence parameter set (SPS), a reference parameter set (RPS), a slice header, etc. Certain details relating to encoding of the signaled information are explained above with respect to FIG. 9.

The information on whether to generate and/or how to generate a residual prediction reference picture can be signaled in various ways. In some embodiments, the decoder 30 can be configured to generate residual prediction reference pictures in a certain way (e.g., generate only $RG_{half}$, only $RG_{one}$, or both), and signaled information includes the number of residual prediction reference pictures to generate. In other embodiments, the decoder 30 is configured to generate a residual prediction reference picture of a certain type (e.g., generate only $RG_{half}$ or $RG_{one}$), and the signaled information includes one or more syntax elements that indicate whether the residual prediction reference picture of that certain type should be generated or not. For example, if a flag indicates a value of 1, it means generate the residual prediction reference picture of the predefined type, and if the flag indicates a value of 0, it means do not generate the residual prediction reference picture of the predefined type.

In certain embodiments, the decoder 30 is configured to generate residual prediction reference pictures of different types, and the signaled information includes one or more syntax elements that indicate whether a residual prediction reference picture should be created and which type of residual prediction reference picture should be created. For example, a flag can indicate multiple values, and each value can be associated with which type(s) of residual prediction reference picture to create. In Embodiment 3 above, 0 means do not generate residual prediction reference pictures, 1 means generate $RG_{half}$, 2 means generate $RG_{one}$, and 3 means generate both $RG_{half}$ and $RG_{one}$.

In some embodiments, the decoder 30 can be configured to generate a residual prediction reference picture based only on the first short-term reference picture in a reference picture list. The signaled information indicates only whether to generate the residual prediction reference picture or not. For example, a flag have a value of 1 to indicate that the residual prediction reference picture should be generated, and a value of 0 to indicate that the residual prediction reference picture should not be generated.

Any of the constraints and/or conforming restrictions described in FIG. 9 can be applied by the decoder 30. The information relating to the constraints or restrictions can be decoded from the signaled information, can be inferred based on the signaled information, or both. Some examples of constraints or conforming restrictions can include:

- Slices belonging to the same picture should share the same GRP reference information. For example, all slices of a picture have the same GRP references in the reference list.
- GPR references should be used in pairs. For example, a picture of an enhancement layer should be reconstructed based on at least two GRP references.
- A GRP reference picture should be used with an inter-layer reference picture. For example, a picture of an enhancement layer should be reconstructed based on a GRP reference picture and an upsampled collocated reference picture of a reference layer. The reference layer can correspond to the enhancement layer associated with the enhancement layer reference picture based on which the GRP reference picture is generated.
- A GPR reference picture may only be used for a current picture so that it is not placed in the DPB.

These constraints or restrictions can be applied in generating residual prediction reference picture(s) or reconstructing a picture of an enhancement layer. The decoder 30 can decode the signaled information according to a predefined syntax and use the decoded information in generating one or more residual prediction reference pictures.

At block 1003, the decoder 30 generates a residual prediction reference picture based on an enhancement layer reference picture and the decoded signaled information. The residual prediction reference picture can be generated based on a reference picture in the enhancement layer and stored in a reference picture list of the enhancement layer. The generated residual prediction reference picture can have the same motion field and the same picture order count (POC) as the enhancement layer reference picture from which it is generated. In one embodiment, the residual prediction reference picture is generated in a manner such that the residual prediction reference picture has the same motion field and the POC as the enhancement layer reference picture. For example, the residual prediction reference picture uses the same motion field as the enhancement layer reference picture on which it is based, and the same POC for the enhancement layer reference picture is assigned to the residual prediction reference picture.

At block 1004, the decoder 30 stores the generated residual prediction reference picture in at least one reference picture list of an enhancement layer in the memory unit. The residual prediction reference picture may be stored and used in prediction, but may not be output (e.g., to a display device). The decoder 30 may have additional RPS subsets in which to store the residual prediction reference pictures. Only residual prediction reference pictures may be stored in these RPS subsets, and residual prediction reference pictures may not be stored in other existing subsets of the enhancement layer reference list.

The decoder 30 may generate a reconstructed picture of the enhancement layer based on the residual prediction reference picture. In one embodiment, the decoder 30 generates an upsampled collocated reference picture of a reference layer of the enhancement layer and generates the reconstructed picture of the enhancement layer based on the residual prediction reference picture and the upsampled collocated reference picture of the reference layer. For example, this may be done when the constraint a GRP reference be used with an inter-layer reference. In a certain embodiment, the residual prediction reference picture may only be used for a current picture so that it is not placed into the DPB.

These techniques may be used in high-level syntax only SHVC. In high-level syntax only SHVC, the signaled information is specified at a slice level or above. Because GRP is not available at a block level, the decoder 30 may generate the reconstructed picture of the enhancement layer without applying a weighting factor to a residue of a corresponding picture in the reference layer associated with the enhancement layer. Instead, the decoder 30 can use one or more residual prediction reference pictures. The process 1000 ends at block 1005.

Any features and/or embodiments described with respect to GRP references in this disclosure may be implemented separately or in any combination thereof.

Another Approach to Mimic GRP in High-Level Syntax Only SHVC

In [7] Aminlou, "Enhanced Inter Layer Reference Picture", another way to mimic GRP in high-level syntax only SHVC was proposed. In this approach, a new reference frame called enhanced inter layer reference ("EILR") picture is generated using the base layer motion information, base layer reference frames, and enhancement layer reference. With this newly generated reference frame, block level GRP can be mimicked.

Figure 11:
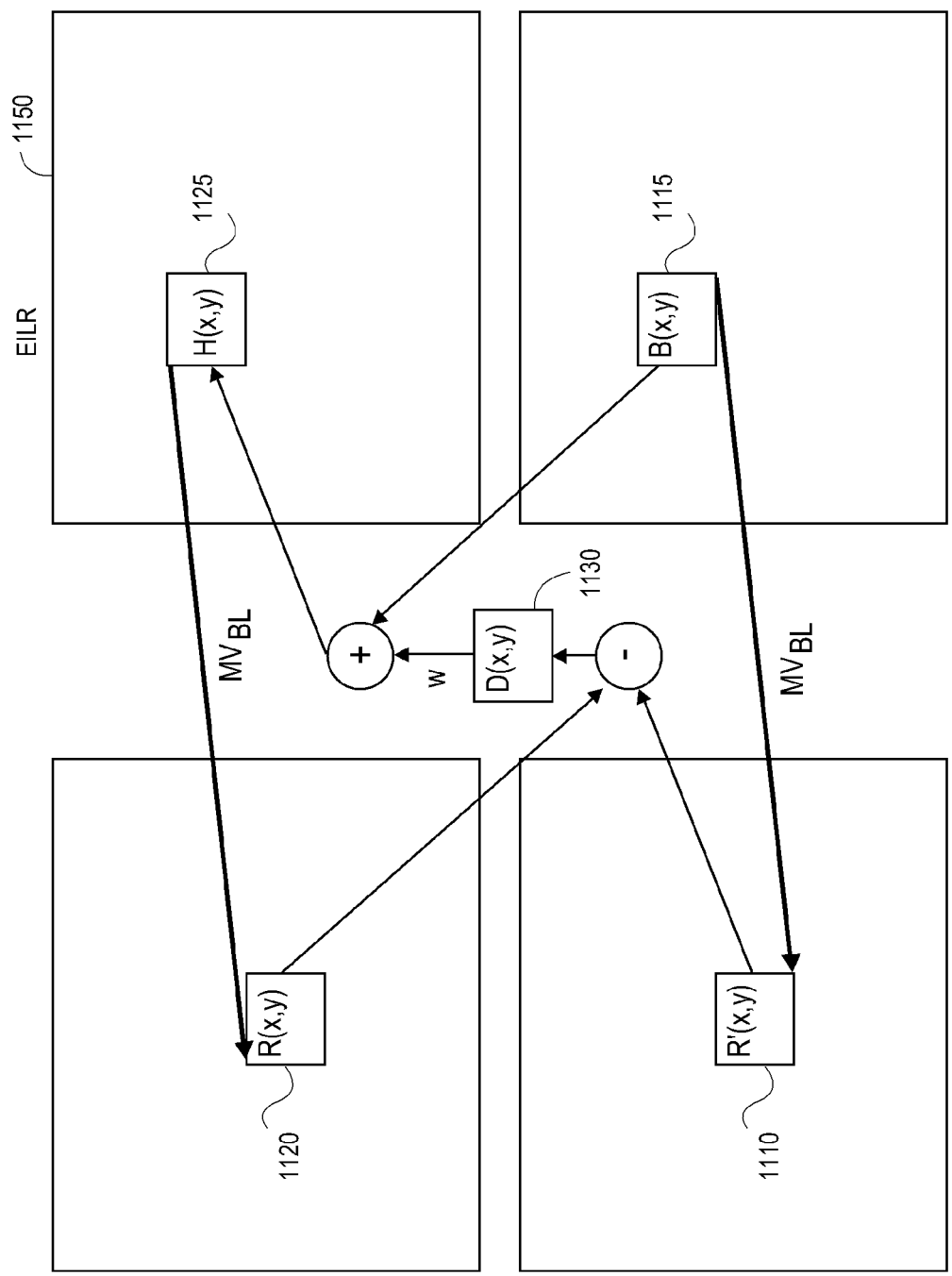
FIG. 11 illustrates generating an enhanced inter layer reference (EILR).

The EILR picture is generated by adding a motion compensated high frequency component from an enhancement layer to reconstructed sample values of the base layer. As shown in FIG. 11, for each block of the EILR 1150 (H(x,y)) 1125, the corresponding collocated block is located in the base layer (B(x,y)) 1115, and its motion information including reference frames and motion vectors ($MV_{BL}$) is extracted. Using the base layer motion information, two blocks are generated by motion compensated prediction from the base layer reference picture (R'(x,y)) 1110 and the corresponding enhancement layer reference picture (R(x,y)) 1120. Then, the difference between these two blocks are calculated (D(x,y)) 1130, multiplied by a weight factor (w) and added to the sample values of the collocated block 1115 of the base layer reference frame to form the block 1125 of the EILR 1150. In [7] Aminlou, a weighting factor of ⅞ for luma component and 1 (i.e., no weighting) for chroma components were used.

In [8] He, "ILR Enhancement with Differential Coding," the weight factor is determined by the encoder and signaled to the decoder. However, to reduce computational complexity and memory access requirements, the motion vector of a GRP block may be rounded to an integer-pixel position, as described in U.S. Provisional Application No. 61/775,352, filed Mar. 8, 2013, U.S. Provisional Application No. 61/803,368, filed Mar. 19, 2013, U.S. Provisional Application No. 61/832,623, filed Jun. 7, 2013, and U.S. application Ser. No. 14/149,260, filed Jan. 7, 2014, the disclosures of which are incorporated herein in their entireties by reference.

In this disclosure, various embodiments are directed to improving the following aspects:
  The generation of GRP reference introduced in [7] Aminlou is not quite efficient but complicated in terms of computational complexity.
  After the GRP reference is inserted into the reference list of enhancement layer, the usage of the GRP reference is not constrained, which leads to less efficiency in terms of coding performance and implementation cost.
  Motion compensation interpolation is not desired during GRP reference generation due to high computational complexity and high memory access requirement. Although a motion vector may be rounded to integer-pixel position, the problem is not fully solved since an integer-pixel-accuracy motion vector may still lead to motion compensation interpolation for chroma component, especially with video contents in a 4:2:0 color format.

According to certain aspects of this disclosure, the GRP reference picture is generated directly by the collocated base layer block and the motion compensated difference between the enhancement layer reference and the base layer reference without any additional weighting factor. In one embodiment, the GRP reference picture is generated according to equations (10) and (11) without incorporating additional weighting factors (e.g., provide weighting factor of 0.5 and 1 only, and no other weighting factors). In certain embodiments, a 3-tap or 4-tap up-sampling/smoothing filter described in U.S. Provisional Application No. 61/758,723, filed Jan. 30, 2013, which is incorporated herein in its entirety by reference, may be used for deriving the motion compensated difference between the enhancement layer reference and the base layer reference. In such embodiments, the GRP reference may be generated as follows. When the collocated base layer block has no motion vector or is intra coded, the up-sampled/filtered reconstruction of the base layer is used for the collocated block in the GRP reference. Alternatively, a default motion vector such as zero motion is assumed for the base block to generate the collocated block in the GRP reference. Alternatively, a motion vector from a neighboring block is used to generate the collocated block in the GRP reference.

As mentioned above, to generate a block in the GRP picture, the reference picture of the collocated base layer block in base layer is indicated by scaled MV of the collocated base layer block. Then, the corresponding reference picture in the enhancement layer is set to the enhancement layer picture which belongs to the same access unit as the reference picture of the base layer. It is possible that the wanted enhancement layer and/or reference layer may not be present in the coded bitstream. When one of two references in the enhancement layer indicated by the MV of the collocated base block (inter coded) which is used to form the current block in the GRP picture is not available, the block is generated by using uni-directional prediction. When both references of the collocated base block (inter coded) are not available in the enhancement layer, the block may be regarded as intra coded, and either of the following operation may apply:
  If a reference of the collocated base block (inter coded) is not available, the first reference that is available in both the enhancement and base layers in the same reference list may be used to derive the motion compensated difference. In this case, the motion vector for the new references should be scaled based on temporal distance, e.g., POC difference.
  Use the collocated base block to form the current block in the GRP reference picture.

The motion field of the GRP reference picture may be generated in the same way as that of inter-layer reference picture (up-sampled collocated base picture). The motion compensation process to derive the motion compensated difference between the enhancement reference and base layer reference can be based on the generated motion field of the GRP reference picture and on a level of minimal unit size in motion field, such as a level of 16×16 block.

When inserting the GRP reference into reference list:
  The GRP reference picture may be marked as a short-term reference and may have non-zero motion vector.
  The GRP reference picture may be marked as a long-term reference and must have zero motion.
  A constraint that the GRP reference picture can only be used for the current enhancement picture and will not be put into DPB may be applied.

A constraint that the GRP reference picture can only be used as the source of uni-directional prediction, which means it cannot be an element of bi-directional prediction.

When initializing the enhancement reference list, the GRP reference picture can be placed right before the inter-layer reference picture. Alternatively, the GRP reference picture replaces the inter-layer reference picture. Similar to GRP reference, some other low level tools such as inferred mode described in U.S. Provisional Application No. 61/749,865, filed Jan. 7, 2013; 61/734,920, filed Dec. 7, 2012; and 61/749,077, filed Jan. 4, 2013, the disclosure of each of which is incorporated herein in its entirety by reference, may be mimicked by generating a new reference frame for the enhancement layer with the base layer motion and enhancement references.

When generating the GRP reference picture, rounded motion vectors can be used so that no motion compensation interpolation is needed for both luma and chroma components. In one embodiment, luma and chroma components share the same rounded motion vector. When video content is in a 4:2:0 color format, motion vector is rounded with double-pixel accuracy to guarantee that no motion compensation interpolation is needed for chroma components. When video content is in a 4:2:2 color format, the horizontal component of motion vector is rounded with double-pixel accuracy while the vertical component of motion vector is rounded with integer-pixel accuracy.

In another embodiment, different rounded versions of the same motion vector are used for luma and chroma components to ensure no motion compensation interpolation is needed. For example for videos in 4:2:0 color format, the motion vector (in ¼ pixel accuracy and represented in 32-bit) for a block is (MVx, MVy). For luma component, the rounded MV may be ((MVx+4)&0xFFFFFFFC, (MVy+4)&0xFFFFFFFC). For chroma components, the rounded MV may be ((MVx+8)&0xFFFFFFF8, (MVy+8)&0xFFFFFFF8). Note that here "&" indicates the bitwise logical operation "and."

The motion vector may always be rounded toward zero, positive infinity, or negative infinity. Alternatively, the motion vector may be rounded toward positive/negative infinity based on its value. For example, the vertical component of a motion vector is rounded toward positive infinity when it is positive, and is rounded toward negative infinity when it is negative. Similarly, the horizontal component of a motion vector can be rounded toward positive infinity when it is positive, and is rounded toward negative infinity when it is negative.

GRP Reference Picture Generation

In this embodiment, the GRP reference picture is generated based on the reconstructed collocated base layer blocks. Let $I_B$ indicate the up-sampled collocated base picture. Suppose $I_B$'s motion field has been generated by motion mapping which is the same as that for generating motion field of inter-layer reference. Let B denote a PU in $I_B$, MV represent the motion vector in of B, and $R_e$, $R'_b$ indicate the enhancement reference and up-sampled/smoothed base reference, respectively. The collocated block in the GRP reference can be generated as follows:

$$R_{GRP} = B + w \cdot MV(R_e - R'_b), \quad (15)$$

where MV(R) indicates the reference block in reference R with the motion vector MV. w indicates the weighted factor, and a typical value of w can be 1. The value of w is predefined based on slice type or other slice level or above information. w may also be signaled in the bitstream. When signaling in the bitstream, w may be quantized based on a predefined value. Additional filtering may applied to B, $R_e$, $R'_b$, $MV(R_e - R'_b)$, or any of the combinations. When block B has two motion vectors, the bi-directional form of (15) may be used. When block B is intra coded, MV(R) can be regarded as 0 so that $R_{GRP} = B$. The generated GRP reference can share the same POC as that of the collocated base picture.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

Information and signals disclosed herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The techniques described herein may be implemented in hardware, software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Various embodiments of the invention have been described. These and other embodiments are within the scope of the following claims.

What is claimed is:

1. An apparatus for decoding video information, the apparatus comprising:
   a memory unit configured to store at least one reference picture list of an enhancement layer, the at least one reference picture list comprising residual prediction reference picture information; and
   a processor operationally coupled to the memory unit and configured to:
   decode signaled information about residual prediction reference picture generation;
   generate a residual prediction reference picture based on an enhancement layer reference picture and the decoded signaled information such that the generated residual prediction reference picture has the same motion field and the same picture order count (POC) as the enhancement layer reference picture from which it is generated; and
   store the generated residual prediction reference picture in the at least one reference picture list of the enhancement layer.

2. The apparatus of claim 1, wherein a plurality of slices of a picture have the same generated residual prediction reference picture.

3. The apparatus of claim 1, wherein the signaled information comprises a flag indicating whether residual prediction reference pictures are used, and wherein the processor is further configured to generate the residual prediction reference picture when the flag indicates that residual prediction reference pictures are used.

4. The apparatus of claim 1, wherein the processor is further configured to store the generated residual prediction reference picture in a reference parameter set (RPS) subset including only residual prediction reference pictures.

5. The apparatus of claim 1, wherein the signaled information comprises a number of residual prediction reference pictures to be generated.

6. The apparatus of claim 1, wherein the residual prediction reference picture is associated with a type selected from a plurality of types of residual prediction references.

7. The apparatus of claim 6, wherein the signaled information comprises one or more syntax elements indicating whether to generate the residual prediction reference picture, and wherein only one of the plurality of types of residual prediction references is available for the residual prediction reference picture to be generated.

8. The apparatus of claim 6, wherein at least two types of the plurality of types of residual prediction reference pictures are available, and the signaled information comprises one or more syntax elements indicating whether to generate the residual prediction reference picture and indicating one of the at least two types for the residual prediction reference picture.

9. The apparatus of claim 1, wherein the processor is further configured to:
   generate a reconstructed picture of the enhancement layer based on the residual prediction reference picture.

10. The apparatus of claim 9, wherein the processor is further configured to:
    generate an upsampled collocated reference picture of a reference layer of the enhancement layer; and
    generate the reconstructed picture of the enhancement layer based on the residual prediction reference picture and the upsampled collocated reference picture of the reference layer.

11. The apparatus of claim 9, wherein the residual prediction reference picture is not placed in a decoded picture buffer (DPB).

12. The apparatus of claim 1, wherein the signaled information is specified at a slice level or above.

13. The apparatus of claim 9, wherein the processor is further configured to generate the reconstructed picture of the enhancement layer without applying a weighting factor to a residue of a corresponding picture in a reference layer associated with the enhancement layer.

14. The apparatus of claim 1, wherein the signaled information is specified at a level selected from: a picture parameter set (PPS), a video parameter set (VPS), a sequence parameter set (SPS), a reference parameter set (RPS), or a slice header.

15. The apparatus of claim 1, wherein the apparatus is selected from a group consisting of one or more of: a desktop computer, a notebook computer, a laptop computer, a tablet computer, a set-top box, a telephone handset, a smart phone, a smart pad, a television, a camera, a display device, a digital media player, a video gaming console, and a video streaming device.

16. A method of decoding video information, the method comprising:
    decoding, using a processor operationally coupled to a memory unit, signaled information about residual prediction reference picture generation;
    generating a residual prediction reference picture based on an enhancement layer reference picture of an enhancement layer and the decoded signaled information such that the generated residual prediction reference picture has the same motion field and the same picture order count (POC) as the enhancement layer reference picture from which it is generated; and
    storing the generated residual prediction reference picture in at least one reference picture list of the enhancement layer in the memory unit.

17. The method of claim 16, wherein the residual prediction reference picture is associated with a type selected from a plurality of types of residual prediction references.

18. The method of claim 17, wherein the signaled information comprises one or more syntax elements indicating whether to generate the residual prediction reference picture, and wherein only one of the plurality of types of residual prediction references is available for the residual prediction reference picture to be generated.

19. The method of claim 17, wherein at least two types of the plurality of types of residual prediction reference pictures are available, and the signaled information comprises one or more syntax elements indicating whether to generate the residual prediction reference picture and indicating one of the at least two types for the residual prediction reference picture.

20. An apparatus for encoding video information, the apparatus comprising:
a memory unit configured to store at least one reference picture list associated with one or more layers of video information in scalable video coding; and
a processor operationally coupled to the memory unit and configured to:
encode information about generating a residual prediction reference picture based at least in part on a corresponding enhancement layer reference picture associated with an enhancement layer, the residual prediction reference picture configured to have the same motion field and the same picture order count (POC) as the enhancement layer reference picture from which it is to be generated; and
signal the encoded information in a bitstream.

21. The apparatus of claim 20, wherein the processor is further configured to apply a constraint that a plurality of slices of a picture have the same generated residual prediction reference picture.

22. The apparatus of claim 20, wherein the encoded information comprises a number of residual prediction reference pictures to be generated.

23. The apparatus of claim 20, wherein the residual prediction reference picture is associated with a type selected from a plurality of types of residual prediction references.

24. The apparatus of claim 23, wherein the plurality of types includes a first type representing a weighting factor of 0.5 and a second type representing a weighting factor of 1.

25. The apparatus of claim 23, wherein the encoded information comprises one or more syntax elements indicating whether to generate the residual prediction reference picture, and wherein only one of the plurality of types of residual prediction references is available for the residual prediction reference picture to be generated.

26. The apparatus of claim 23, wherein at least two types of the plurality of types of residual prediction reference pictures are available, and the encoded information comprises one or more syntax elements indicating whether to generate the residual prediction reference picture and indicating one of the at least two types for the residual prediction reference picture.

27. The apparatus of claim 20, wherein the encoded information comprises one or more syntax elements indicating whether to generate the residual prediction reference picture based on a first short-term reference picture in a reference picture list associated with the enhancement layer.

28. The apparatus of claim 20, wherein the encoded information is specified at a level selected from: a picture parameter set (PPS), a video parameter set (VPS), a sequence parameter set (SPS), a reference parameter set (RPS), or a slice header.

29. A method of encoding video information, the method comprising:
encoding, using a processor operationally coupled to a memory unit, information about generating a residual prediction reference picture based at least in part on a corresponding enhancement layer reference picture associated with an enhancement layer,
wherein the residual prediction reference picture configured to have the same motion field and the same picture order count (POC) as the enhancement layer reference picture from which it is to be generated, and
wherein the memory unit is configured to store at least one reference picture list associated with one or more layers of video information in scalable video coding; and
signaling the encoded information in a bitstream.

30. The method of claim 29, wherein the residual prediction reference picture is associated with a type selected from a plurality of types of residual prediction references, and wherein at least two types of the plurality of types of residual prediction reference pictures are available, and the encoded information comprises one or more syntax elements indicating whether to generate the residual prediction reference picture and indicating one of the at least two types for the residual prediction reference picture.

* * * * *